(12) United States Patent
Gagné et al.

(10) Patent No.: US 10,807,633 B2
(45) Date of Patent: Oct. 20, 2020

(54) ELECTRIC POWER STEERING ASSEMBLY AND SYSTEM WITH ANTI-ROTATION COUPLER

(71) Applicant: KA Group AG, Zürich (CH)

(72) Inventors: Francis Gagné, Shawinigan (CA); Mattias Johansson, Hökerum (SE); Frederic Gervais, Saint-Mathieu-du-Parc (CA)

(73) Assignee: KA Group AG, Zurich (CH)

( * ) Notice: Subject to any disclaimer, the term of this patent is extended or adjusted under 35 U.S.C. 154(b) by 628 days.

(21) Appl. No.: 15/593,998

(22) Filed: May 12, 2017

(65) Prior Publication Data

US 2018/0327020 A1 Nov. 15, 2018

(51) Int. Cl.
*B62D 5/00* (2006.01)
*B62D 5/04* (2006.01)

(52) U.S. Cl.
CPC .............. *B62D 5/001* (2013.01); *B62D 5/005* (2013.01); *B62D 5/04* (2013.01); *B62D 5/0403* (2013.01);
(Continued)

(58) Field of Classification Search
CPC .......... B62D 5/001; B62D 5/005; B62D 5/04; B62D 5/0403; B62D 5/0406; B62D 5/0409
(Continued)

(56) References Cited

U.S. PATENT DOCUMENTS

| 5,652,487 | A | | 7/1997 | Nishino et al. |
| 5,673,938 | A | * | 10/1997 | Kaliszewski .......... B62D 1/195 248/231.31 |

(Continued)

FOREIGN PATENT DOCUMENTS

| CN | 101017117 A | 8/2007 |
| CN | 101078671 A | 11/2007 |

(Continued)

OTHER PUBLICATIONS

English language abstract and computer-generated translation for KR20060101623 extracted from espacenet.com on Dec. 13, 2017; 5 pages.

(Continued)

*Primary Examiner* — Ruth Ilan
*Assistant Examiner* — Conan D Duda
(74) *Attorney, Agent, or Firm* — Howard & Howard Attorneys PLLC

(57) ABSTRACT

An electric powered steering assembly and system for a vehicle. A sensor is coupled to a housing for detecting input from a user, such as to a steering member. An electric motor is coupled to the housing and controllable by a computer module. The electric motor supplies an assistive torque to a steering shaft of the vehicle. A coupler couples the housing to a chassis of the vehicle. The coupler prevents rotational movement of the housing about the steering shaft while permitting axial movement of the housing along with the steering shaft. The coupler may permit relative movement between the housing and the chassis in five degrees of freedom. A mounting bracket may be rigidly connected to the chassis. The coupler may comprise a coupling bracket and a link having a spherical joint coupled to the mounting bracket. Methods of installation and operating electric powered steering system are also disclosed.

30 Claims, 11 Drawing Sheets

(52) U.S. Cl.
CPC ......... *B62D 5/0406* (2013.01); *B62D 5/0409* (2013.01); *B62D 5/0421* (2013.01)

(58) Field of Classification Search
USPC ........................................................ 180/444
See application file for complete search history.

(56) References Cited

U.S. PATENT DOCUMENTS

| | | | |
|---|---|---|---|
| 6,360,841 B1 | 3/2002 | Blandino et al. | |
| 6,378,647 B1 | 4/2002 | Birsching et al. | |
| 6,389,924 B1 | 5/2002 | Ryne et al. | |
| 6,913,108 B2 | 7/2005 | Ikeda | |
| 7,497,299 B2 | 3/2009 | Kobayashi | |
| 7,640,824 B2* | 1/2010 | Manwaring | B62D 1/184 74/492 |
| 7,866,435 B2 | 1/2011 | Streng et al. | |
| 8,672,086 B2 | 3/2014 | Wong et al. | |
| 9,783,223 B2* | 10/2017 | Martinez | B62D 1/189 |
| 2002/0070618 A1 | 6/2002 | Ikeda | |
| 2002/0112913 A1 | 8/2002 | Chen et al. | |
| 2004/0182190 A1 | 9/2004 | Murakami et al. | |
| 2005/0016314 A1* | 1/2005 | Kinme | B62D 1/189 74/493 |
| 2006/0169525 A1* | 8/2006 | Saito | B62D 1/16 180/444 |
| 2006/0201270 A1 | 9/2006 | Kobayashi | |
| 2009/0031844 A1* | 2/2009 | Iwakawa | B62D 1/181 74/493 |
| 2009/0260914 A1 | 10/2009 | Streng et al. | |
| 2009/0266640 A1* | 10/2009 | Oshima | B62D 5/04 180/444 |
| 2011/0071729 A1 | 3/2011 | Oblizajek et al. | |
| 2011/0100148 A1* | 5/2011 | Jung | B62D 1/189 74/492 |
| 2013/0233117 A1* | 9/2013 | Read | B62D 1/181 74/493 |
| 2014/0116187 A1* | 5/2014 | Tinnin | B62D 1/184 74/493 |
| 2014/0197293 A1* | 7/2014 | Fujiwara | B62D 1/195 248/274.1 |
| 2014/0246266 A1* | 9/2014 | Harada | B62D 1/187 180/443 |
| 2015/0013493 A1* | 1/2015 | Back | B62D 1/195 74/493 |
| 2015/0203145 A1* | 7/2015 | Sugiura | B62D 1/189 74/493 |
| 2015/0203146 A1* | 7/2015 | Kii | B62D 1/184 74/493 |
| 2016/0121919 A1* | 5/2016 | Mihara | B62D 1/184 74/493 |
| 2017/0008545 A1* | 1/2017 | Hong | B62D 1/187 |

FOREIGN PATENT DOCUMENTS

| | | |
|---|---|---|
| CN | 102200488 A | 9/2011 |
| CN | 202182827 U | 4/2012 |
| CN | 103792098 A | 5/2014 |
| CN | 104326016 A | 2/2015 |
| EP | 860346 A2 | 1/1999 |
| EP | 1262392 A2 | 3/2004 |
| EP | 2476593 A1 | 7/2012 |
| EP | 2757867 A1 | 7/2014 |
| EP | 2769901 A1 | 8/2014 |
| EP | 2857283 A1 | 4/2015 |
| EP | 2861481 A1 | 4/2015 |
| KR | 20060101623 A | 9/2006 |
| WO | 200266310 A1 | 8/2002 |
| WO | 2013034514 A1 | 3/2013 |
| WO | 2013186492 A1 | 12/2013 |

OTHER PUBLICATIONS

English language abstract and computer-generated translation for EP2476593 extracted from espacenet.com on Dec. 13, 2017; 5 pages.

English language abstract and computer-generated translation for CN104326016 extracted from espacenet.com on Dec. 13, 2017; 9 pages.

English language abstract and computer-generated translation for CN103792098 extracted from espacenet.com on Dec. 13, 2017; 9 pages.

English language abstract and computer-generated translation for CN202182827 extracted from espacenet.com on Dec. 13, 2017; 5 pages.

English language abstract and computer-generated translation for CN101078671 extracted from espacenet.com database on Dec. 13, 2017; 5 pages.

English language abstract and computer-generated translation for CN101017117 extracted from espacenet.com on Dec. 13, 2017; 6 pages.

English language abstract and computer-generated translation for CN102200488 extracted from espacenet.com on Dec. 13, 2017; 6 pages.

English language abstract and computer generated translation for WO2013186492 extracted from espacenet.com on Jan. 2, 2018; 9 pages.

* cited by examiner

ELECTRIC POWER STEERING ASSEMBLY AND SYSTEM WITH ANTI-ROTATION COUPLER

BACKGROUND

Power assisted steering systems are primarily directed to reducing the physical effort needed to steer an automotive vehicle. Known power assisted steering systems are typically hydraulic, electric, or a combination thereof, and provide a force output to turn the wheels of the vehicle. The force output is often modified as compared to an input provided by the user, typically a driver of the vehicle turning a steering wheel. In electro-hydraulic systems, for example, a pump driven by an electric motor urges hydraulic fluid into a double-acting cylinder having an actuated valve. The hydraulic fluid provides the force output to a steering mechanism. Electric power assisted steering systems utilize an electric motor with suitable gearing to apply the force output to the steering gear, such as a rack and pinion or Pitman arm known to many automotive applications. In both electro-hydraulic and electric power assisted steering systems, the force output is typically based on the magnitude of the input provided by the user, such as the amount by or torque with which the user turns the steering wheel. These systems may utilize one or more sensors to detect turning of the steering wheel and convert the input to an electrical signal. Based on a detected change in position and/or torque of the steering column, a computer module controls the electric motor(s) accordingly.

FIGS. 1A and 1B show schematic representations of electric powered steering systems 20' previously known in the art. The system 20' of FIG. 1A includes tilt-adjustable or multi-link steering with such systems being present in vehicles such as modern and/or luxury passenger automobile, side-by-side vehicles (SSVs), and tractors. The system 20' may comprise a steering column 22' including an input shaft 24' coupled to a steering member (not shown), such as a steering wheel, actuatable by the user. The input shaft 24' may be coupled to a steering shaft 26'. It is known to use a universal joint 28' to couple the input shaft 24' with the steering shaft 26', so as to constrain relative rotational and planar movements between the input shaft 24' and the steering shaft 26, but permit relative articulation between the input shaft 24' and the steering shaft 26' to adjust the tilt of the steering wheel. The steering shaft 26' may be coupled to a steering mechanism 30' known in electric power assisted steering systems. For example, the steering mechanism 30' may be the pump and valve assembly of a hydraulic or the electro-hydraulic power assisted steering system as described. In another example, the steering shaft 26' may be coupled to the rack (i.e., linear "gear" bar) of the rack and pinion actuator, a reduction gear, or other suitable intermediate gearing ultimately providing the force output to move the wheels of the vehicle. A universal joint 28' may couple the steering shaft 26' and the steering mechanism 30'. Other suitable steering mechanisms are considered known to those having skill in the art. The system 20' of FIG. 1A includes a direct steering shaft without adjustability of the tilt of the steering wheel. No discrete input shaft is provided, and the steering shaft 26' is coupled to the steering member (not shown). Direct steering shafts are present in vehicles such as older and/or economy passenger automobiles, smaller sports cars, snowmobiles, all-terrain vehicles (ATVs), and the like.

The steering shaft 26' of known electric powered steering systems 20' is coupled to the chassis of the vehicle, illustrated as reference numeral 32' in the schematic representation of FIGS. 1A and 1B. Generally speaking and as used herein, the chassis 32' is any portion of the base frame or internal frame that supports the construction of the vehicle. The coupling of the steering shaft 26' to the chassis 32' may be effectuated through one or more structural members 34', 36' rigidly affixed to the chassis 32'. A housing encasing at least a portion of the steering shaft 26' may also be provided.

An electric power steering (EPS) assembly 38' is operatively coupled to the steering shaft 26'. FIGS. 1A and 1B show the steering shaft 26' rotatably disposed within the EPS assembly 38'. To permit rotational movement of the steering shaft 26' within the EPS assembly 38' during operation, the EPS assembly 38' may be coupled to a structure, most often the chassis 32', as illustrated in FIGS. 1A and 1B.

In such an arrangement, however, external loads on the steering shaft 26' from the EPS assembly 38' may result in poor performance of the electric powered steering system 20'. The external loads may be caused by any number of forces and/or moments from the EPS assembly 38' due to, for example, misalignment, impact, vibration, and/or excessive axial forces on the steering shaft 26' (e.g., sudden pushing or pulling on the steering wheel). These undesirable external loads are particularly prevalent in heavy vehicles in off-highway applications (e.g., agricultural implements), off-road recreational applications (e.g., ATVs, utility task vehicles (UTVs), SSVs, and the like, which endure more demanding operating conditions and utilize looser connections along the powered steering system. Further, the external loads undesirably reduce unit life of the EPS assembly 38'.

The electric powered steering system 20' of FIGS. 1A and 1B results in the steering shaft 26' being statically indeterminate, or hyperstatic. As known in the field of statics, a structure is hyperstatic if the static equilibrium equations are insufficient for determining the internal forces and reactions on that structure. With the steering shaft 26' coupled at its ends with the universal joints 28' and radially constrained to the chassis 32' by the structural members 34', 36, the EPS assembly 38' may provide an external load on the steering shaft 36' due to, misalignment, impact, and the like, as described. A torque sensor may sense these external loads on the steering shaft 26' and provide inadvertent, perhaps erratic, signals to a computer module of the EPS assembly 38'. The problem is particularly prevalent with systems having magnetoelastic-type torque sensors. The computer module then controls the electric motor of the EPS assembly 38' based on the inadvertent signals from the torque sensor with the possible net result being unintended movement of the wheels and dangerous, unexpected turning of the vehicle. Since the steering shaft 26' is a hyperstatic structure in the system 20' of FIGS. 1A and 1B, the external loads on the steering shaft 26' can neither be determined nor sufficiently accounted for.

Certain flexible joints, such as rubber brackets, may dampen some vibration and other forces, but the brackets permit movement of the housing in all directions relative to the chassis 32', including rotation of the EPS assembly 38' about the steering shaft 26', which comprise performance of the sensor and the system. Therefore, there is a need in the art for an electric powered steering system that minimizes external loads on the steering shaft to improve performance of the torque sensor and unit life of the EPS assembly. The alignment and movement of the EPS assembly relative to the steering shaft should be maintained or preserved. There is a further need in the art for a coupling that satisfies the aforementioned needs in a simpler, cost-effective manner.

Those having skill in the art readily appreciate that space is at a premium in vehicle design generally, and especially so for the area of the chassis to which the electric powered steering system is installed. In existing vehicles sought to be retrofit with an electric powered steering system, space constraints may be even more extreme since electric powered steering may not have been contemplated during original design and manufacture of the vehicle. Therefore, still another need exists in the art for an electric powered steering system that may be mounted on the vehicle without requiring undue space within the chassis.

SUMMARY

According to an exemplary embodiment, an electric powered steering system for a vehicle comprising a chassis and wheels is disclosed. The steering system comprises a steering member for receiving an input from a user. A steering shaft is coupled to the steering member for providing an output to move the wheels of the vehicle. A housing is provided with the steering shaft at least partially extending through the housing. A sensor is coupled to the housing for detecting the input from the user. A computer module is in electric communication with the sensor for receiving signals from the sensor based on the input. An electric motor is coupled to the housing and controllable by the computer module to supply an assistive torque to the steering shaft based on the signals. The assistive torque comprising the output. The steering system further comprises a coupler adapted for coupling the housing to the chassis of the vehicle. The coupler prevents rotational movement of the housing about the steering shaft while permitting axial movement of the housing along with the steering shaft.

According to another exemplary embodiment of the present disclosure, an electric powered steering assembly is mountable on a chassis of a vehicle comprising a housing and a sensor coupled to the housing for detecting input from a user. A computer module is in electric communication with the sensor to receive signals from the sensor based on the input. An electric motor is coupled to the housing and controllable by the computer module. A mounting bracket is provided and adapted to be rigidly connected to the chassis. A coupler couples the housing and the mounting bracket. The coupler prevents relative rotation between the housing and the mounting bracket while permitting relative movement between the housing and the mounting bracket in five degrees of freedom.

According to still another exemplary embodiment, an electric powered steering assembly is mountable to a mounting bracket rigidly connected to a chassis of a vehicle comprising a steering shaft. The steering assembly comprises a housing adapted for receiving the steering shaft. A sensor is coupled to the housing for detecting input from a user. A computer module is in electric communication with the sensor to receive signals from the sensor based on the input. An electric motor coupled to the housing and controllable by the computer module. The steering assembly comprises a coupler rigidly connected to the housing and adapted for coupling the housing to the mounting bracket with a first kinematic joint. The coupler comprises a coupling bracket and a link coupled to the coupling bracket with a second kinematic joint. The first and second kinematic joints are adapted for permitting relative movement between the housing and the mounting bracket in five degrees of freedom.

A method of operating electric powered steering system is disclosed. A vehicle comprises a chassis and wheels. The electric powered steering system comprises a steering member for receiving an input from a user, a steering shaft coupled to the steering member, a housing with the steering shaft at least partially extending through the housing, a sensor coupled to the housing for detecting the input from the user, a computer module in electric communication with the sensor, an electric motor coupled to the housing and controllable by the computer module, and a coupler coupling the housing to the chassis of the vehicle. The method comprises the step of receiving with the steering member the input of the user. The sensor detects the input from the user. The computer module receives signals from the sensor. The electric motor supplies an assistive torque to the steering shaft based on the signals. The assistive torque is directed to moving the wheels of the vehicle. The coupler prevents rotational movement of the housing about the steering shaft, and permits axial movement of the housing along with the steering shaft.

BRIEF DESCRIPTION OF THE DRAWINGS

Advantages of the present disclosure will be readily appreciated as the same becomes better understood by reference to the following detailed description when considered in connection with the accompanying drawings.

DETAILED DESCRIPTION

Figure 2:
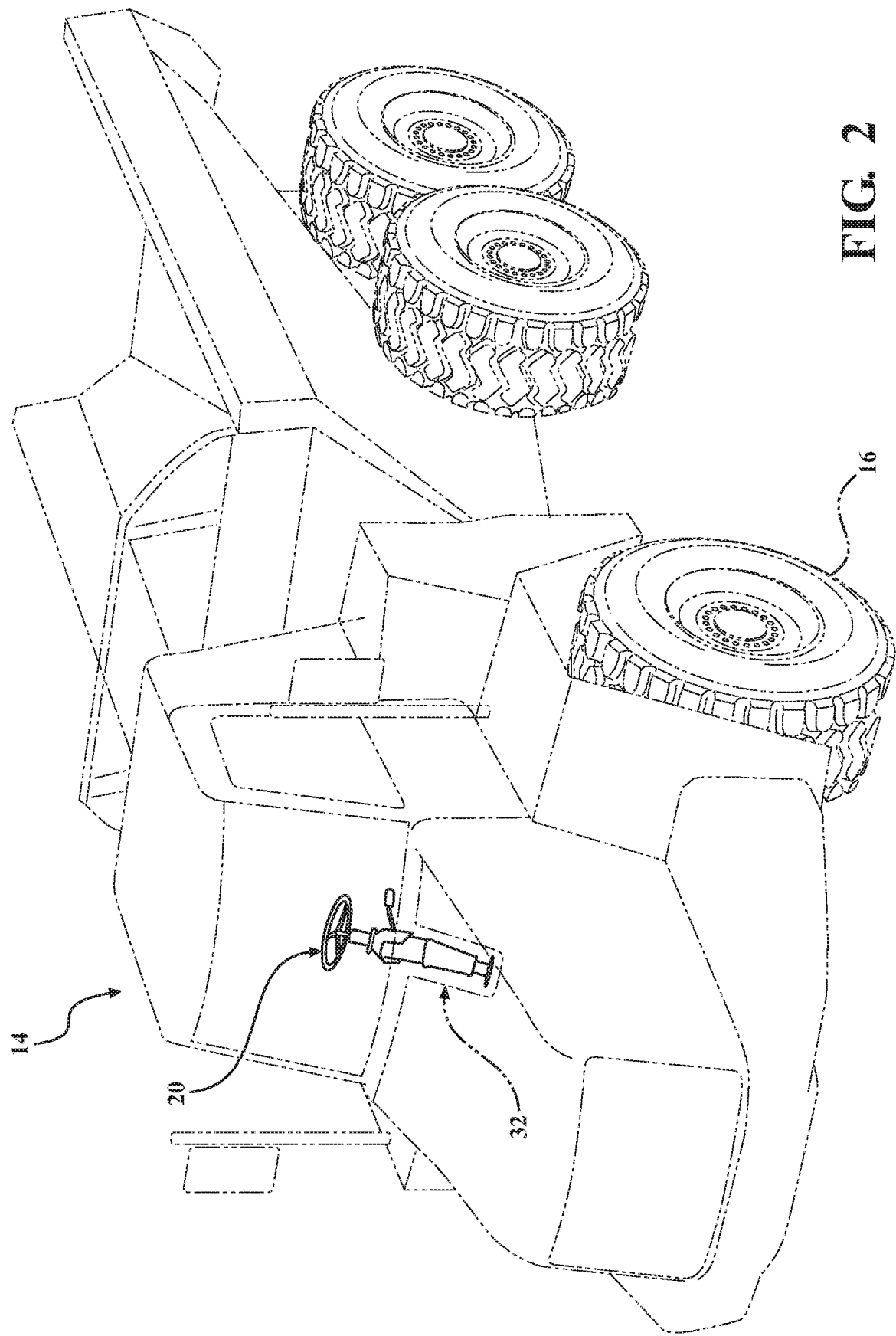
FIG. 2 is a perspective view of a vehicle.

FIG. 2 shows a vehicle 14 comprising an electric powered steering system 20 to be described. The vehicle 14 shown in FIG. 2 is a dump truck, but it should be appreciated that the electric powered steering system 20 may be provided on any size and/or type of driven vehicle comprising a chassis 32 and one or more wheels 16 capable of being steered by an input from a user. Exemplary driven vehicles include, but are not limited to, semi-trailer trucks, tractors, bulldozers, agricultural implements, passenger cars, trucks, vans and sport utility vehicles (SUVs), ATVs, UTVs, SSVs, and recreational vehicles (RVs).

Figure 3:
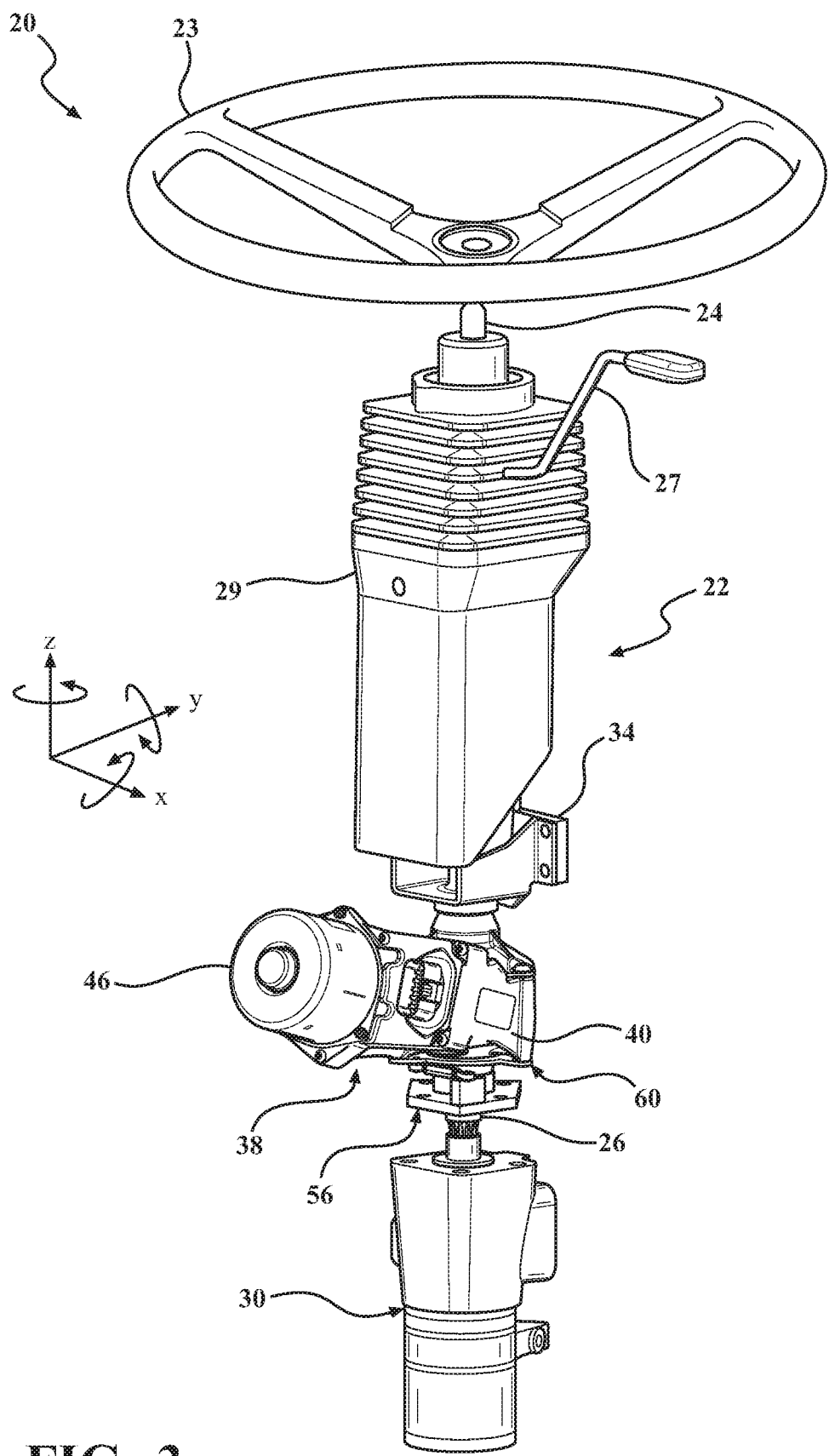
FIG. 3 is a perspective view of an electric powered steering system in accordance with an exemplary embodiment of the present disclosure.
Figure 4:
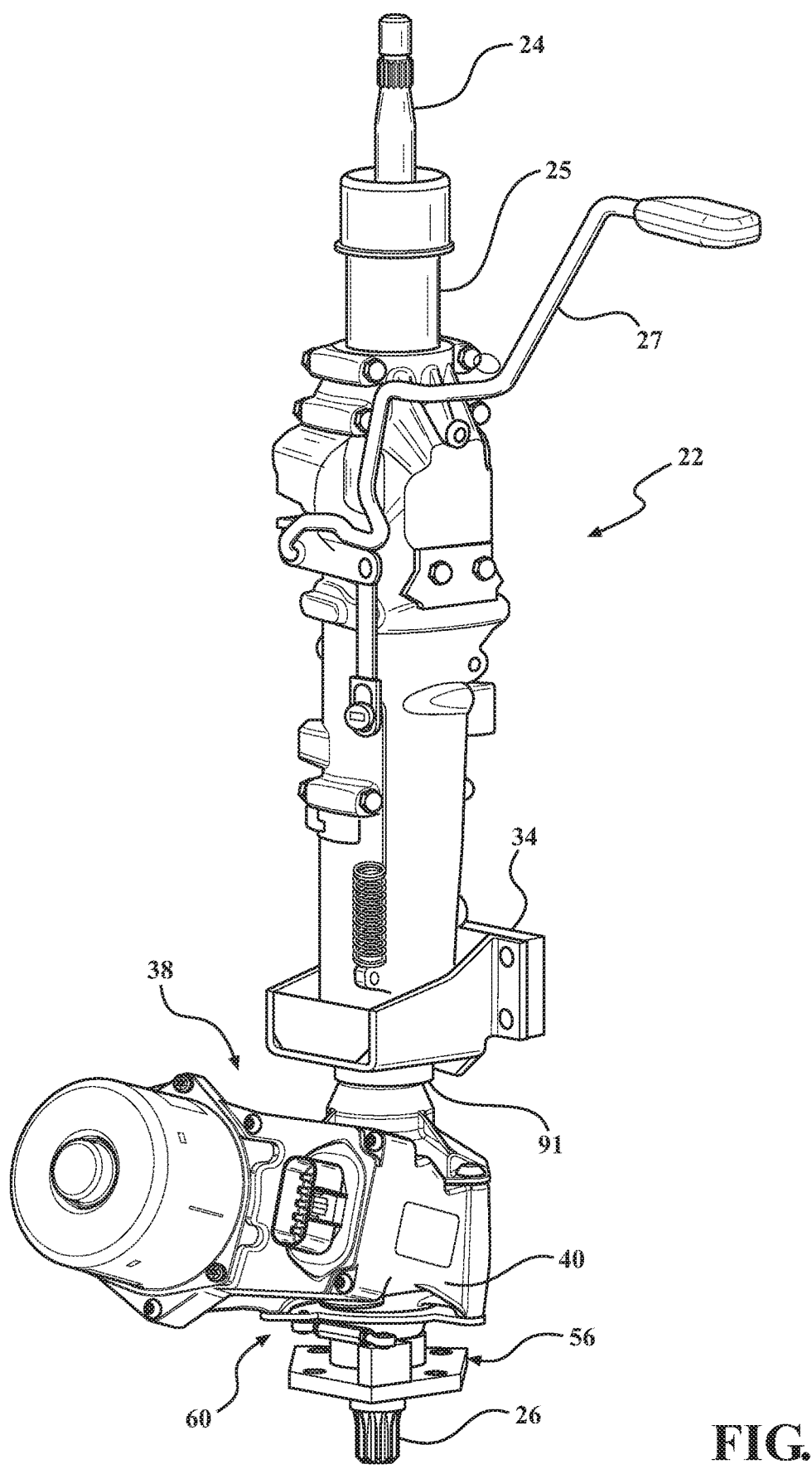
FIG. 4 is another perspective view of the electric powered steering system of FIG. 3. The steering wheel and a cover for the steering column have been removed.

An exemplary embodiment of the electric powered steering system 20 of the present disclosure is shown in FIGS. 3 and 4. The electric powered steering system 20 comprises a steering column 22 and a steering member 23 coupled to the steering column 22. The steering member 23 is preferably a steering wheel of any suitable size and shape. Other embodiments of the steering member 23 are contemplated, such as opposing levers linearly operable in tandem to provide a directional input to the electric powered steering system 20. The steering member 23 is for receiving the input from the user. The steering column 22 comprises an input shaft 24 coupled to the steering member 23. The input shaft 24 is rigidly connected to the steering member 23 such that the input provided to the steering member 23 results in a corresponding input to the input shaft 24. For example, the user turning the steering wheel by twenty degrees results in the input shaft 24 turning by twenty degrees. A column jacket 25 of the steering column 22 may at least partially encase the input shaft 24.

A primary mechanical function of the steering column 22 is to transfer the input provided to the steering member 23 towards the steering mechanism 30 (e.g., the steering gear). The steering column 22 does so while providing ergonomic working conditions for the user. For example, the steering column 22 may be fixed or provide tilt and/or telescoping functionality. The tilt feature may include variable angles for step-in and step-out positions with an incremental or infinity locking system. The telescoping feature may provide variable steering column length with infinite positioning between low and high telescope positions. One or more hand levers 27 may be provided and actuable by the user to operate the tilt and/or telescoping features. Alternatives to the hand lever include a foot pedal or cable operated release. Additional features include vibration damping systems, driver control modules, switches, horn modules, and displays. A cover may be provided 29 for aesthetics and safeguarding the components of the steering column 22. The steering column 22 is preferably compatible with a variety of types of steering wheel connections. The steering column 22 is also preferably compatible with a variety of steering mechanisms 30, such as the hydraulic pump interface shown in FIG. 3. Exemplary steering columns 22 suitable for the present application include Model Nos. T200, T350, T400, T425, T450, TT550, TT600, TT700, TT750, XT850, XT950, XT1050, and XT1050M manufactured by Kongsberg Automotive (Kongsberg, Norway).

The steering column 22 is coupled to the chassis 32 of the vehicle. FIGS. 3 and 4 show a structural member such as a column bracket 34 positioned at a base of the steering column 22 opposite the steering member 23. The column bracket 34 is configured to be rigidly mounted to the chassis 32 of the vehicle with fastening, brazing, welding, or other known joining means. The column bracket 34 constrains the base of the steering column 22 in six degrees of freedom—movement along and rotation about the x-, y-, and z-axes. With the input shaft 24 and/or the steering shaft 26 rotatable within the steering column 22, the column bracket 34 is adapted to constrain the input shaft 24 and/or the steering shaft 26 in at least four degrees of freedom—movement along and rotation about the x-, y-axes. The telescoping functionality may require the input shaft 24 and/or the steering shaft 26 movable along the z-axis. As mentioned, the tilt and telescoping features may provide movement of another portion of the steering column 22 including the steering member 23 relative to the portion rigidly mounted to the chassis 32.

The electric powered steering system 20 comprises a steering shaft 26 coupled to the steering member 23. In certain embodiments, the steering shaft 26 is coupled to the input shaft 24 connected to the steering member 23. Steering columns 22 with tilt and/or telescoping features may provide relative movement, such as relative articulation, between a portion of the input shaft 24 and the steering shaft 26. In other embodiments, the electric powered steering system 20 lacks a discrete input shaft 24 and the steering shaft 26 is directly coupled to the steering member 23.

The steering shaft 26 provides an output to move the wheels 16 of the vehicle 14. More specifically, the steering shaft 26 may provide an output to a steering mechanism 30 that moves the wheels 16 of the vehicle 14. In hydraulic power steering systems, such as the system 20 illustrated in FIG. 3, steering mechanism 30 includes a pump and a valve assembly coupled to the steering shaft 26. The pump may be powered by the engine through means commonly known in the art. The output of the steering shaft 26 from an electric power steering assembly 38 to be described operates the valve assembly in a desired manner to permit forces from the hydraulic fluid to move the wheels 16 of the vehicle 14. In electric power steering systems, for example, the steering shaft 26 may terminate as a pinion gear that is mechanically coupled, via a reduction gear or other intermediate gearing, to the rack of the rack and pinion actuator, in which the output from the steering shaft 26 provides the mechanical forces to move the wheels 16 of the vehicle 14. Additional components may be provided intermediate the steering mechanism 30 and the wheels 14 to effectuate the desired movement.

It is well understood that power assisted steering systems reduce the physical effort needed to move the wheels 16 by providing assistive output greater than the input provided by the user to the steering member 23. The assistance is facilitated by the electric power steering (EPS) assembly 38 coupled to the steering shaft 26. In a general sense, the EPS assembly 38 supplies an assistive torque to the steering shaft 26 based on the input from the user to the steering member 23. The assistive torque comprises the output to the steering mechanism 30 that moves the wheels 16 of the vehicle 14. FIG. 3 shows the EPS assembly 38 positioned intermediate the steering column 22 and the steering mechanism 30. Other suitable locations for the EPS assembly 38 are contemplated. For example, in typical passenger vehicles wherein nearly an entirety of the steering column 22 is disposed within the dashboard of the vehicle, space may permit the EPS assembly 38 to be positioned proximate the steering member 23. In such an embodiment and others, the EPS assembly 38 may provide the output to the input shaft 24 coupled to the steering shaft 26, in which case the steering shaft 26 transfers the assistive torque supplied to the input shaft 24 by the EPS assembly 38 to the steering mechanism 30. Other suitable configurations are contemplated and within the scope of the present disclosure.

Figure 5:
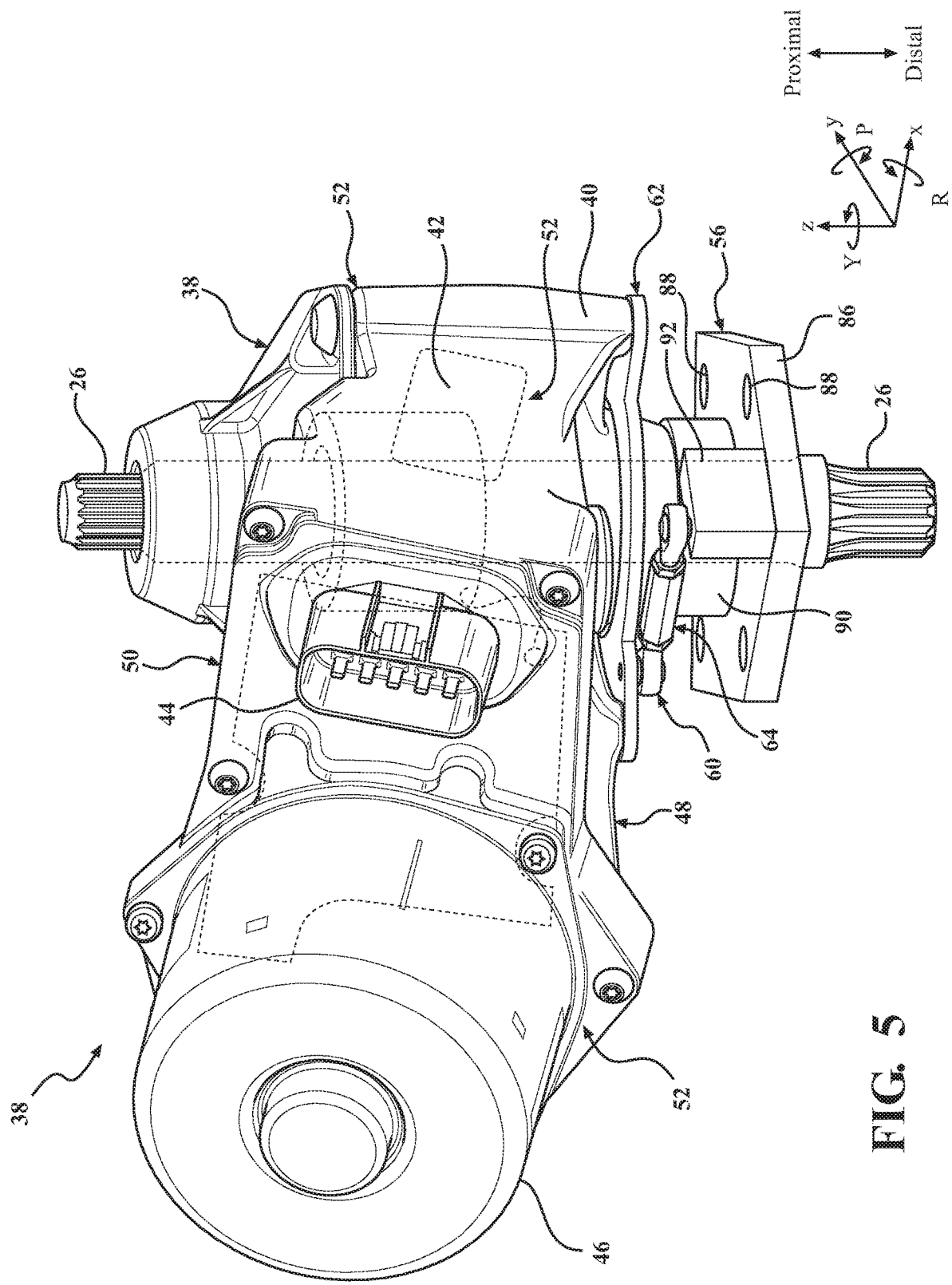
FIG. 5 is a perspective view of an electric powered steering assembly of the electric powered steering system of FIG. 3.

The electric powered steering system 20 comprises a housing 40, at least one sensor 42, a computer module 44, and an electric motor 46. The housing 40, the sensor 42, the computer module 44, and the electric motor 46 may comprise the EPS assembly 38. Referring to FIG. 5, the steering shaft 26 at least partially extends through the housing 40. The housing 40 may be of any suitable size and shape for accommodating the components of the EPS assembly 38. In certain embodiments, the housing 40 comprises a distal side 48, a proximal side 50 opposite the distal side 48, and opposing lateral sides 52 separating the distal side 48 and the proximal side 50. The housing 40 may be characterized generally as box-shaped, but other suitable shapes are within the scope of the present disclosure. In the exemplary embodiment illustrated in FIG. 5, the steering shaft 26 extends through the distal side 48 and/or the proximal side 50.

The sensor 42 is coupled to the housing 40 for detecting the input from the user. In a preferred embodiment, the sensor 42 is a torque sensor for measuring the steering force applied by the user to the steering member 23. The torque sensor independently determine the input to the steering member 23 based on the direction of the input (e.g., right-hand or left-hand turn to the steering wheel). In one example, the sensor 42 comprises a capacitive sensor providing a capacitive measurement by reading a change in position between input and output portions of a torsion bar (not shown) subject to a torque. A magnetic sensor (e.g., Hall sensor) may monitor the twist of the torsion bar or the steering shaft 26 by measuring the change in magnetic flux generated by a change in position relative to a stator. The Hall-type sensor may have a low stiffness to detect the change in position between the input and output of the torsion bar. In another example, the sensor 42 comprises a magneto-restrictive sensor utilizing opposing coils of wire to measure deformation of a magnetic field caused by displacement of a shaft such as the steering shaft 26. In still another example, the sensor 42 comprises a magneto-elastic sensor measuring a change in magnetic flux caused by magnetized material under torque. Sensors of the magneto-restrictive and magneto-elastic types may have high stiffness with less than one degree of deflection. The sensor 42 of the present disclosure is represented schematically in phantom in FIG. 5. In addition to the torque sensor, the electric powered steering system 20 may utilize a position sensor to provide positional signals to the computer module 44.

The computer module 44 is in electric communication with the sensor 42. The computer module 44 receives signals from the sensor 42 based on the input from the user to the steering member 23. In one of the examples previously described, the opposing coils of wire increase and correspondingly decrease voltage signals provided to the computer module 44 based on the direction and amount of input. The computer module 44 interprets the relative change in signal voltages as steering direction and shaft torque. Signals converted from changes in magnetic flux and other sensed parameters are also contemplated. The computer module 44 is represented schematically in FIG. 5, and it is to be understood the computer module 44 typically comprises a circuit within the housing 40. The control module 44 may alternatively be positioned external or remote to the housing 40.

The computer module 44 may use a variety of data from the vehicle to determine how much steering assist to provide for improved vehicle performance. The data may be from vehicle speed sensors, wheel position, gear position, engine revolutions per minute (RPM), tracking control system, force feedback, selectable modes, and the like. For example, a vehicle traveling on pavement will require much less steering assist than a vehicle traveling on sand or snow. The selectable modes may include "normal" and "sport" modes for desired vehicle handling in certain situations.

The electric motor 46 is coupled to the housing 40 and in electric communication with the computer module 44. The electric motor 46 is controllable by the computer module 44 to supply the assistive torque to the steering shaft 26. The assistive torque to the steering shaft 26 comprises the output from the steering shaft 26 of the EPS assembly 38 as previously described. The electric motor 46 may be any suitable actuator such as a brush-type or brushless-type motor. The electric motor 46 may be an alternating current (AC) or a reversible direct current (DC) motor coupled to a suitable energy source (e.g., a battery) that it is not dependent on the engine for its power source to provide electric powered steering when the engine is off. The electric motor 46 may be coupled to the steering shaft 26 through any suitable gearing.

Referring again to FIGS. 3 and 4, the steering column 22 proximal to the EPS assembly 38 (i.e., towards the steering member 23) is rigidly mounted to the chassis 32 of the vehicle 14 as described. The input shaft 24 is adapted to rotate within the steering column 22, but is otherwise constrained from movement in at least four degrees of freedom. The input shaft 24 proximate the EPS assembly 38 is generally constrained from moving or tilting in any lateral direction. The steering shaft 26, a proximal end of which is connected via splines or otherwise to a distal end of the input shaft 24, is thusly constrained from movement in at least four degrees of freedom. Furthermore, the steering shaft 26 distal to the EPS assembly 38 is coupled to the chassis 32 of the vehicle 14. For example, FIGS. 3 and 4 show a mounting bracket 56 adapted to be rigidly connected to the chassis 32 of the vehicle 14. The mounting bracket 56 is configured to receive fasteners to be rigidly connected to the chassis 32, but other known joining means are contemplated. The steering shaft 26 extends through the mounting bracket 56 and is adapted to rotate within the mounting bracket 56, but otherwise constrained from movement in at least four degrees of freedom. In another example, the steering column 22 is directly coupled to the chassis 32 without the mounting bracket 56. The steering shaft 26 distal the EPS assembly 38 is generally constrained from moving or tilting in any lateral direction. Proximal and distal axial movement of the steering shaft 26 may occur but often is undesirable for reasons to be described.

Figure 1A:
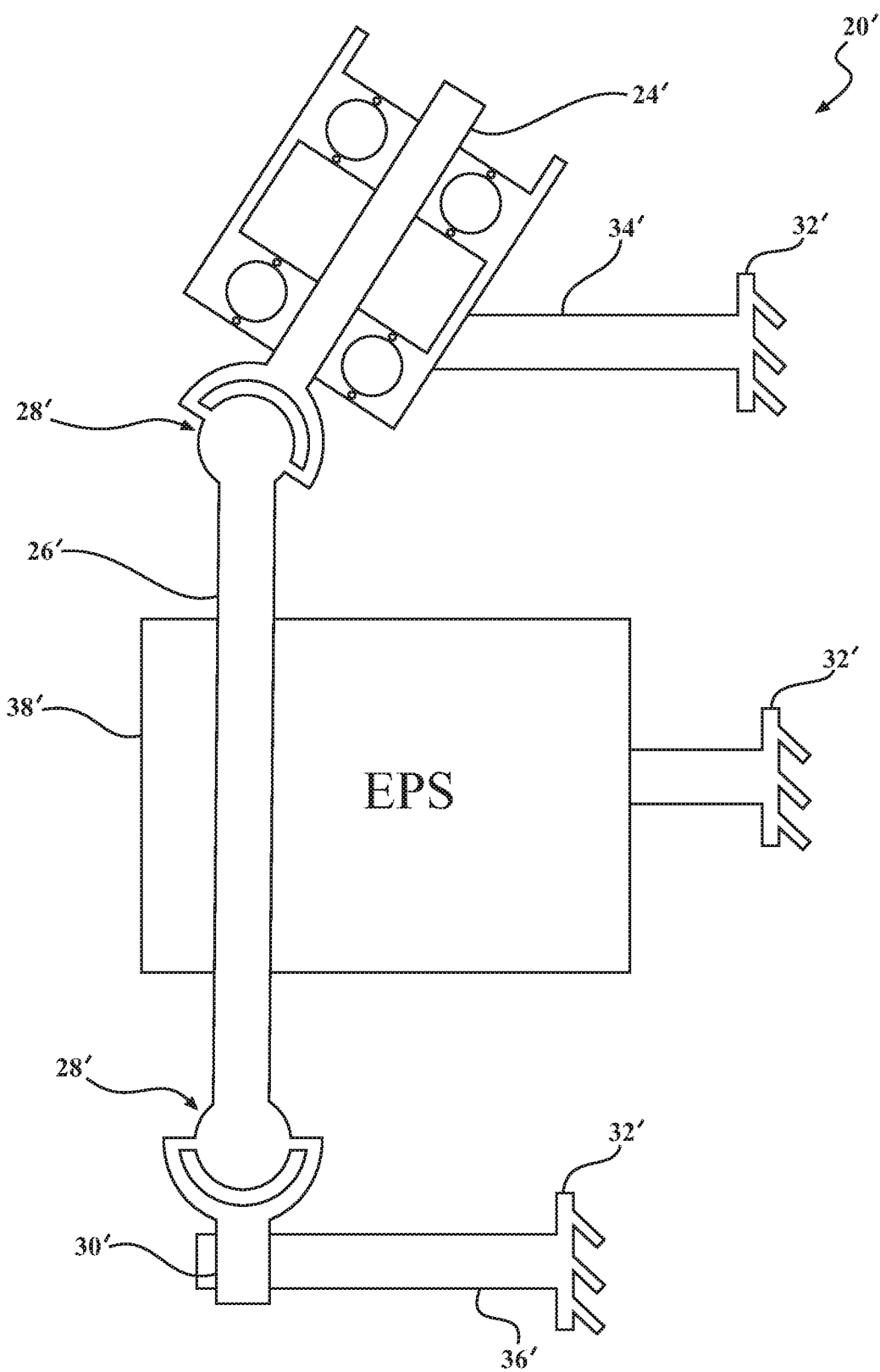
FIG. 1A is schematic representation of an electric powered steering system known in the art.
Figure 1B:
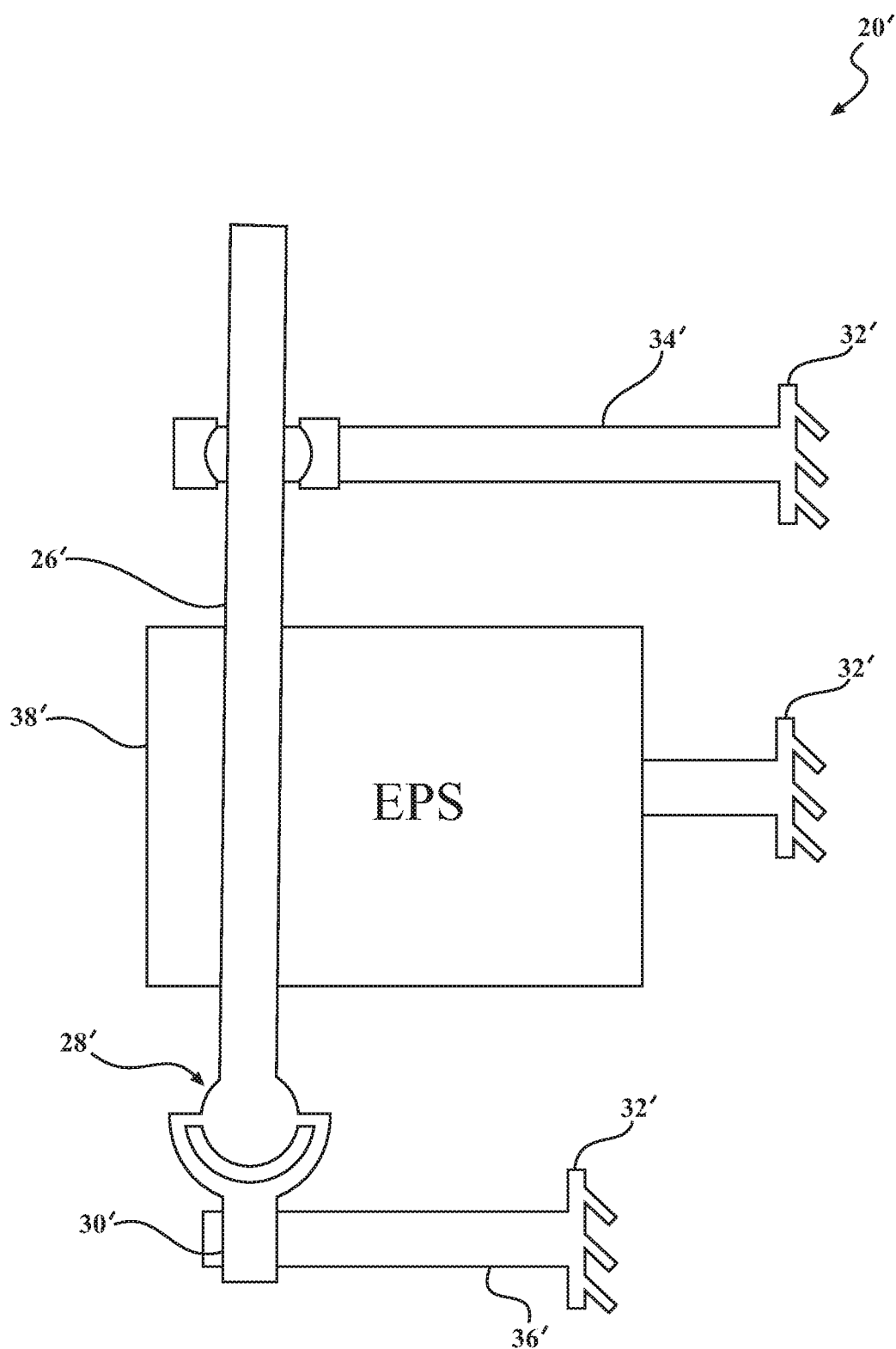
FIG. 1B is schematic representation of another electric powered steering system known in the art.

Should the housing 40 of the EPS assembly 38 be rigidly mounted to the chassis 32 of the vehicle 14, the arrangement would assume the configuration shown in FIGS. 1A and 1B and described in detail above. The kinematic constraints on the EPS assembly 38 as well as the steering shaft 26 both proximal and distal the EPS assembly 38 would result in a hyperstatic system with the associated shortcomings described above.

The electric powered steering system 20 comprises a coupler 60 adapted for coupling the housing 40 of the EPS assembly 38 to the chassis 32 of the vehicle 14. In certain embodiments, the coupler 60 may be considered a component of the EPS assembly 38. The coupler 60 prevents rotational movement of the housing 40 about the steering shaft 26 while permitting axial movement of the housing 40 along an axis of the steering shaft 26. In certain embodiments, the coupler 60 permits axial movement of the housing 40 along with movement of the steering shaft 26. In known systems lacking the advantageous features of the present disclosure, axial or lateral forces, for example, to the steering shaft 26 would result on undesirable external loads on the steering shaft 26 from the EPS assembly 38, possibly comprising the performance of the sensor 42 as described.

In certain embodiments, the coupler 60 may prevent rotation of the housing 40 of the EPS assembly 38 relative to the chassis 32 of the vehicle 14, but permit relative movement between the housing 40 and the chassis 32 in five degrees of freedom. With reference to FIG. 5, the six degrees of freedom, as commonly known in the art, are translational movement along the x-, y- and z-axes as well rotational movement about the same, namely pitch (P), yaw (Y) and roll (R), respectively. The z-axis is aligned with the axis of steering shaft 26 in the convention of FIG. 5. The coupler 60 thusly prevents yawing (i.e., rotation about the z-axis) of the EPS assembly 38 relative to the chassis 32, but permits translational movement along the x-, y- and z-axes as well as pitching and rolling.

The steering shaft 26 rotates within the housing 40 of the EPS assembly 38. It is the rotation of the steering shaft 26 relative the housing 40 that is detected by the sensor 42 coupled to the housing 40. It readily follows that the sensor 42 coupled to the housing 40 must be precluded from rotating with the steering shaft 26, otherwise the torque and/or position of the steering shaft 26 reflective of the user input to the steering member 23 will be inaccurately detected by the sensor 42. The computer module 44 will receive correspondingly inaccurate signals and direct the electric motor 46 accordingly, resulting in poor performance of the electric powered steering system 20.

The coupler 60 described herein prevents rotation of the EPS assembly 38 relative to the chassis 32 with the steering shaft 26 rotating within the EPS assembly 38. In other words, rotation of the steering shaft 26 relative to the EPS assembly 38 is fully preserved such that the input transmitted to the steering shaft 26 is accurately detected by the sensor 42 coupled to the housing 40. The coupler 60 does so while permitting movement of the EPS assembly 38 in all remaining degrees of freedom such that any movement of and/or forces upon the steering shaft 26 are compensated for by corresponding movement of the EPS assembly 38. The coupler 60 providing for compensation for the movement of and/or forces upon the steering shaft 26 maintains the relative positioning between the EPS assembly 38 and the steering shaft 26 to ensure optimal performance of the sensor 42 and thus the electric powered steering system 20. Further, the coupler 60 compensates for misalignment of the steering shaft 26 and/or the housing 40. The misalignment may occur due to variances in installation, tolerancing of components, and/or operational demands of the vehicle 14.

In certain embodiments, the housing 40 may be adapted to be free from connection to the chassis 32 except for a connection from the coupler 60. In other words, the coupler 60 may provide the singular direct connection between the housing 40 and the chassis 32.

The steering shaft 26 is rotatably coupled to the housing 40. As previously described, the steering shaft 26 at least partially extends through and is rotatable relative the housing 40. One or more bearings (not shown) may couple to the steering shaft 26 and the housing 40. Referring to FIG. 5, the bearings effectively permit relative rotation of the steering shaft 26 within the housing 40 (i.e., yawing), but prevent relative translation between the steering shaft 26 and the housing 40 along the x- and y-axes as well as relative pitching and rolling about the same, respectively. In certain embodiments, the bearings further prevent relative translation between the steering shaft 26 and the housing 40 along the z-axis. Thus, the steering shaft 26 provides a kinematic constraint to the housing 40 of the EPS assembly 38 such that relative movement is permitted between the housing 40 and the steering shaft 26 in one or two degrees of freedom. In other words, the steering shaft 26 locates or constrains the housing 40 in four or five degrees of freedom relative to the chassis 32.

Between the constraints collectively from the steering shaft 26 and the coupler 60, the housing 40 is adapted to be located or constrained relative to the chassis 32 in five degrees of freedom such that movement is permitted between the housing 40 and the chassis 32 in one degree of freedom; i.e., the housing 40 is axially movable relative to the chassis 32 (along the z-axis). Likewise, collectively from the steering shaft 26 and the coupler 60, the housing 40 is adapted to be located or constrained relative to the steering shaft 26 in five degrees of freedom such that movement is permitted between the housing 40 and steering shaft 26 in one degree of freedom; i.e., the steering shaft 26 is rotatable relative to the housing 40 (yawing about the z-axis) as described. The electric powered steering system 20 with the coupler 60 prevents a hyperstatic system in which the EPS assembly 38, and more particularly the sensor 42, are subjected to external loads from the steering shaft 26 during operation.

In one operational example, and with reference to FIG. 5, an axial force (i.e., along the z-axis), such as the user pulling on the steering wheel of the vehicle, may cause the steering shaft 26 to move along the positive z-axis. The coupler 60 permits the housing 40 of the EPS assembly 38 to translate along the z-axis along with the steering shaft 26, thereby maintaining the relative positioning between the EPS assembly 38 and the steering shaft 26. For another example, the steering shaft 26 may be subjected to a lateral force (i.e., along the x- and/or y-axes), such as the vehicle impacting a pothole, uneven terrain, or the like. The coupler 60 permits the housing 40 of the EPS assembly 38 to translate along the x- and y-axes along with the steering shaft 26, thereby maintaining the relative positioning between the EPS assembly 38 and the steering shaft 26. Further examples include maintaining the relative positioning during vibrational forces, reaction forces, braking forces, and the like. Among other things, maintaining the relative positioning between the housing 40 and the steering shaft 26 while preventing rotational movement of the housing 40 relative to the chassis 32 ensures optimal performance of the sensor 42 and the electric powered steering system 20 generally.

Figure 7:
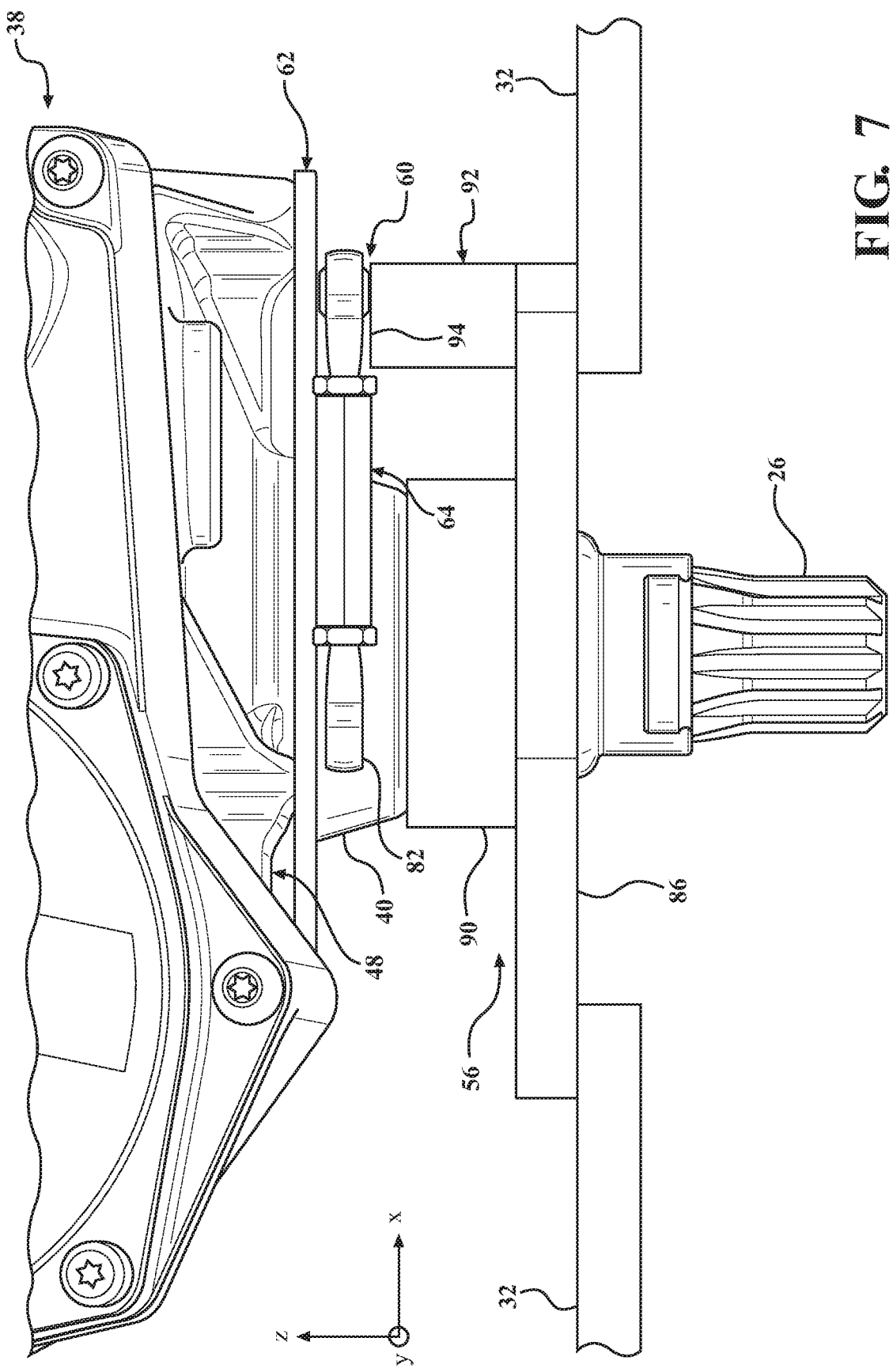
FIG. 7 is a partial elevation view of an electric powered steering assembly of FIG. 5. The mounting bracket is rigidly connected to a chassis of a vehicle.
Figure 8:
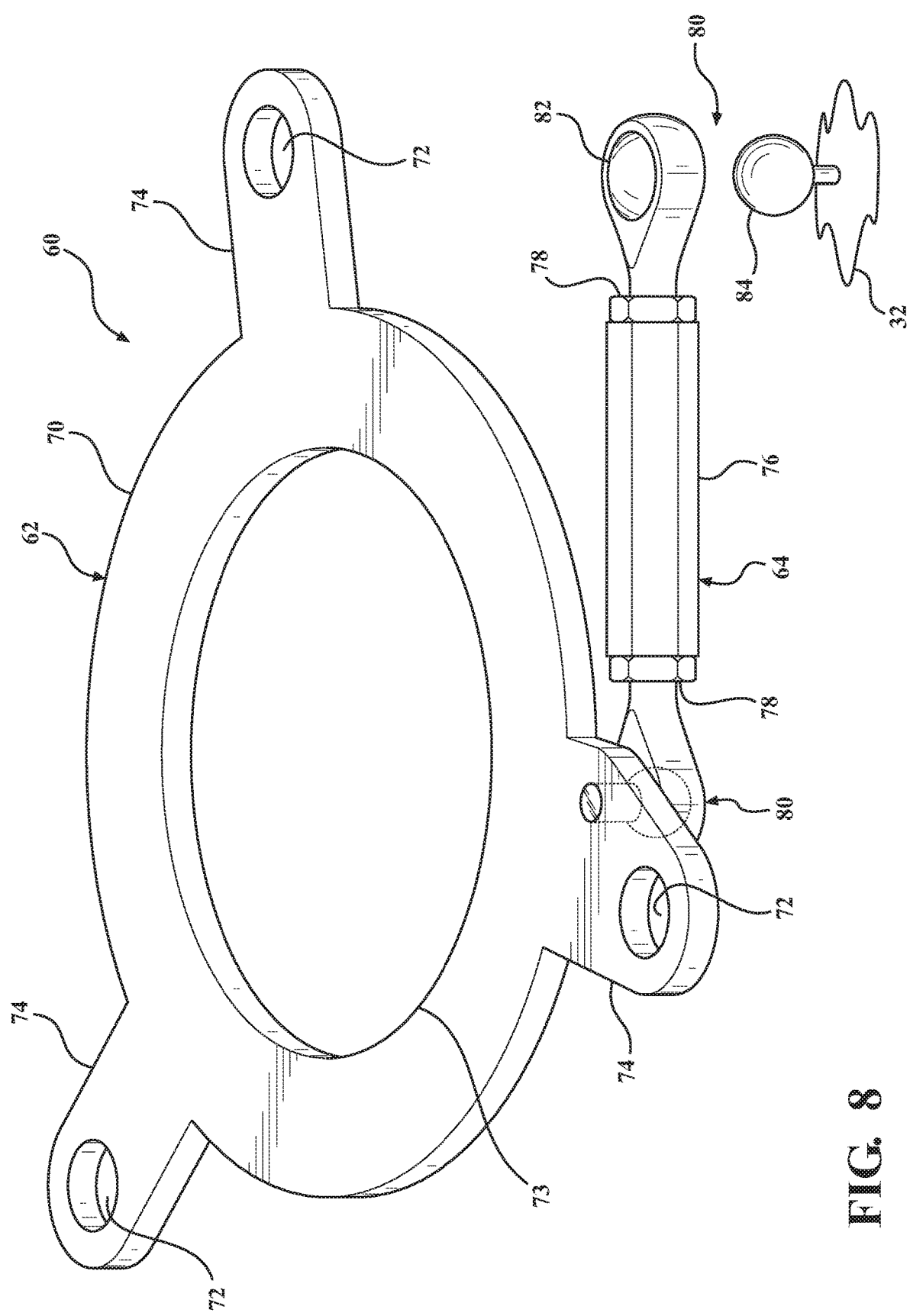
FIG. 8 is a perspective view of the coupler of FIG. 5. The chassis of the vehicle is represented schematically.
Figure 9:
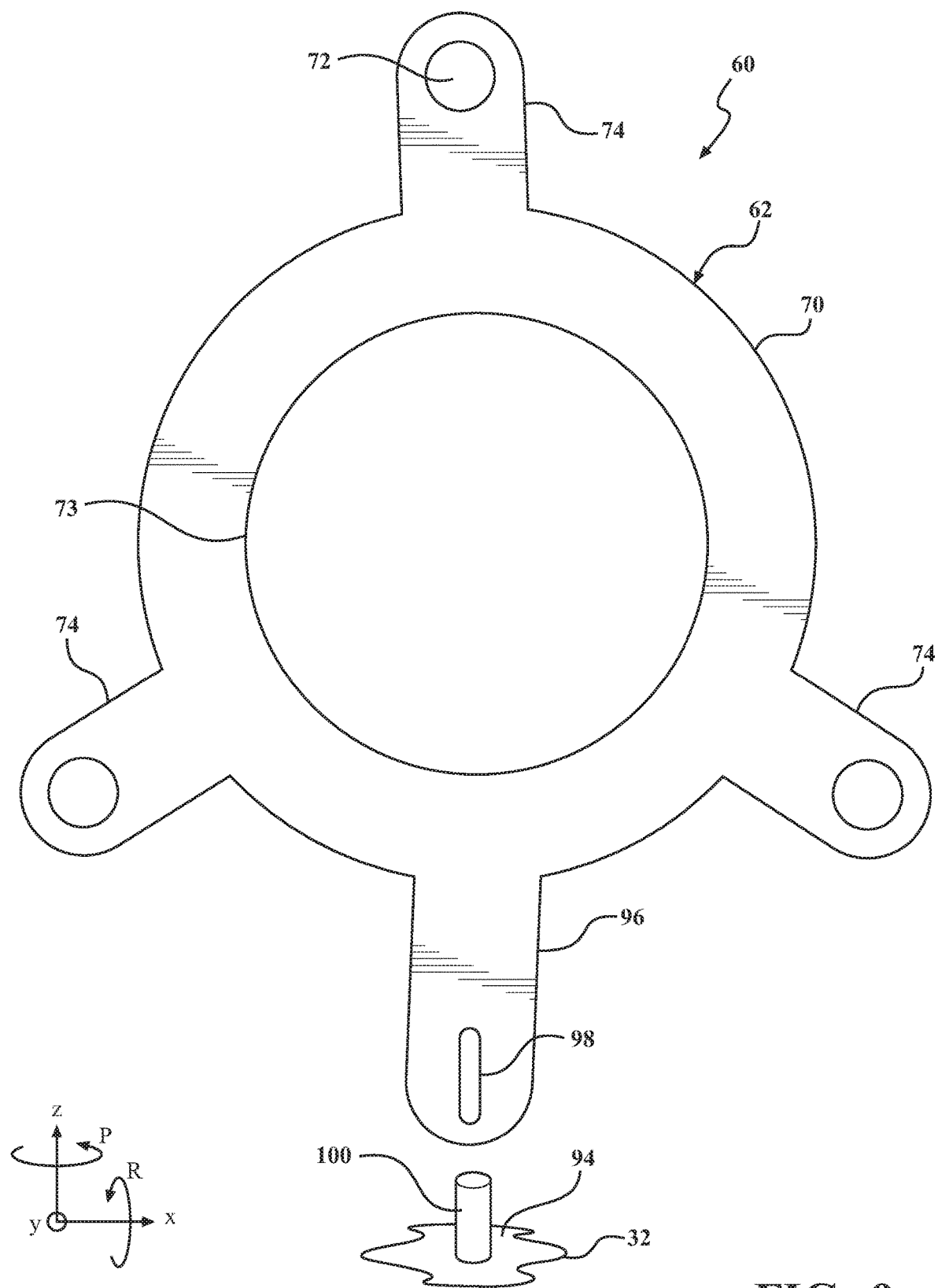
FIG. 9 is a plan view of a coupler in accordance with an exemplary embodiment of the present disclosure. The chassis of the vehicle is represented schematically.
Figure 10:
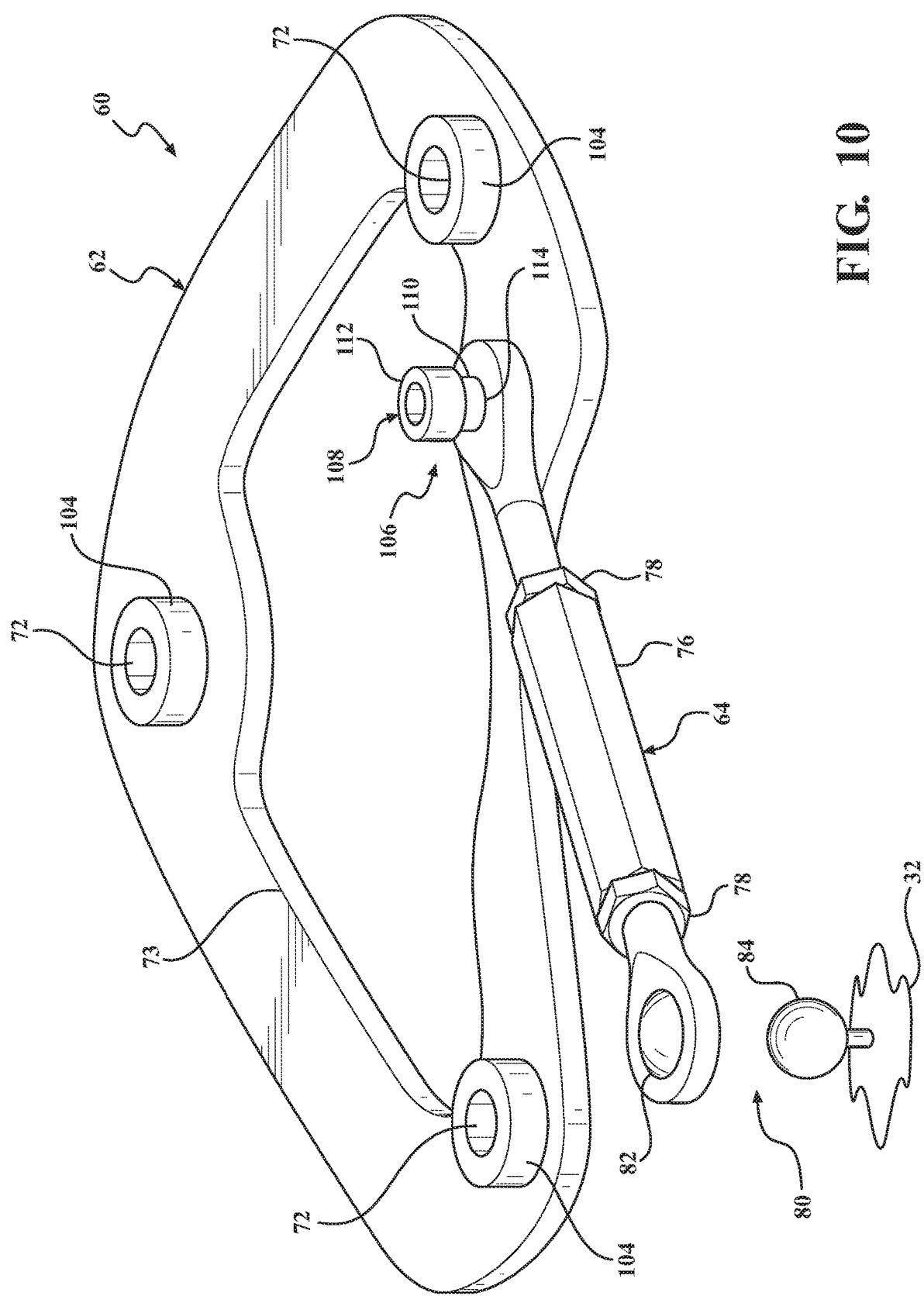
FIG. 10 is a perspective view of a coupler in accordance with an exemplary embodiment of the present disclosure. The chassis of the vehicle is represented schematically.

FIGS. 5 and 7 show the coupler 60 coupled to the mounting bracket 56 to be described further, but it is to be understood that the coupler 60 may be adapted for coupling the housing 40 of the EPS assembly 38 to any suitable structure on the chassis 32. For example, coupler 60 may be directly or indirectly coupled to a floorboard of the vehicle 14, a firewall of the vehicle 14, or the like. For another example, the EPS assembly 38 may be disposed within a channel of a dashboard of the vehicle 14 with the coupler 60 directly or indirectly coupled to a wall of the channel. FIGS. 8-10 schematically represent the chassis 32 as a "ground," and it is to be understood this represents the mounting bracket 56 coupled to the chassis 32 or any suitable structure that is considered part of the chassis 32 of the vehicle 14.

Figure 6:
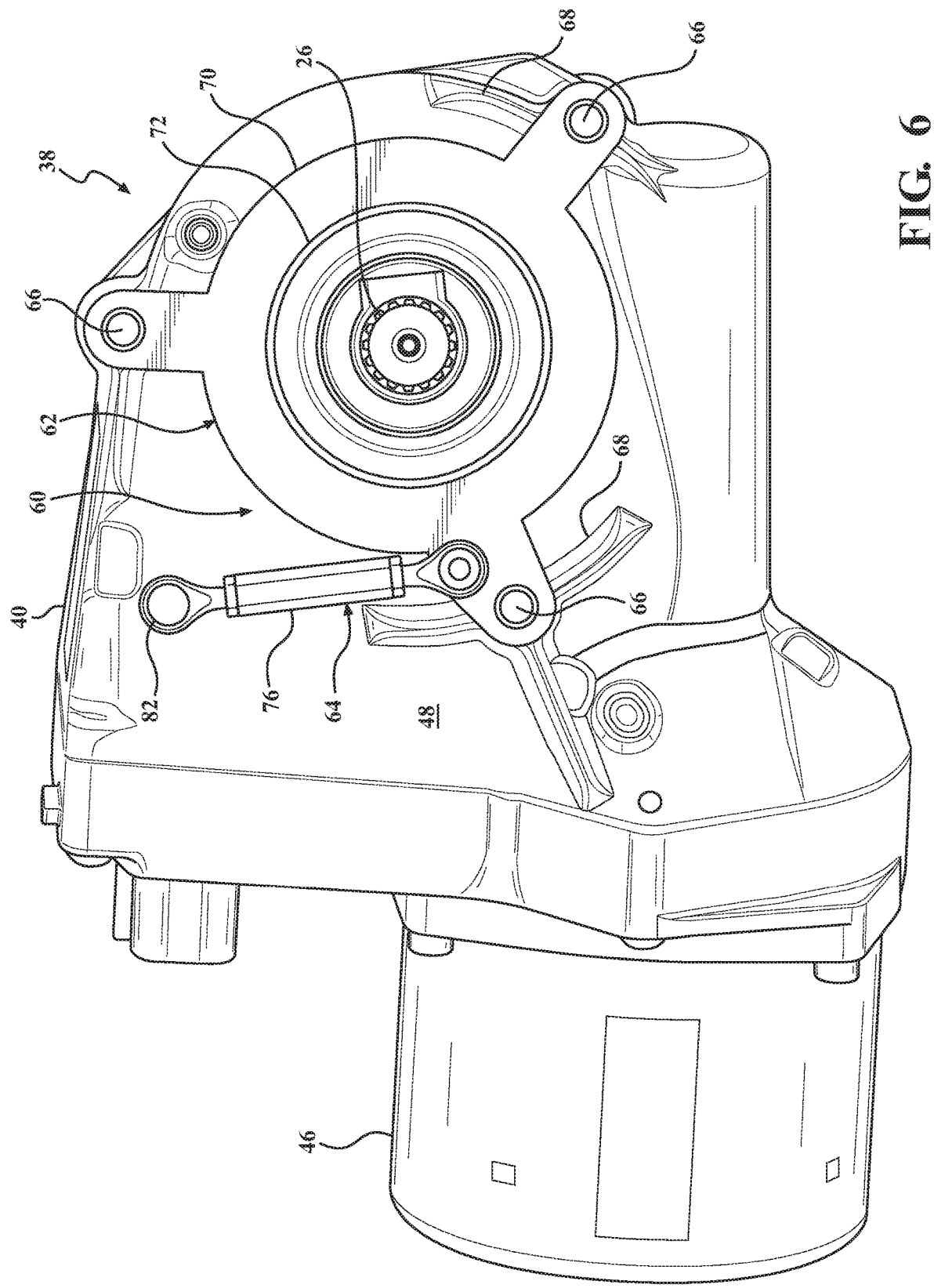
FIG. 6 is a bottom plan view of an electric powered steering assembly of FIG. 5.

Referring to FIG. 5-8, the coupler 60 in accordance with one exemplary embodiment is shown. The coupler 60 is coupled to the distal side 48 of the housing 40. Alternatively, the coupler 60 may be alternatively coupled to the proximal side 50 of the housing 40, or a second coupler (not shown) may be provided and coupled to the housing 40 opposite the coupler 60. The coupler 60 may comprise a coupling bracket 62 rigidly coupled to the housing 40, and a link 64 adapted for coupling the coupling bracket 62 to the chassis 32 of the vehicle 14. The link 64 prevents rotational movement of the coupling bracket 62 about the steering shaft 26 while permitting axial movement of the coupling bracket 62 along the steering shaft 26. The coupling bracket 62 may be directly or indirectly coupled to the distal side 48 of the housing 40. FIG. 6 shows the coupling bracket 62 rigidly mounted or affixed to the distal side 48 of the housing 40 with three fasteners 66 such as bolts, screws, or other suitable joining means. The distal side 48 of the housing 40 comprises one or more raised features 68 configured to receive the fasteners 66, but the coupler 60 may be suitably adapted to be retrofitted to existing housing of an EPS assembly in a manner to be described.

In certain embodiments, the coupling bracket 62 may be a substantially circular disc 70 defining an aperture 73. The circular disc 70 may be flat or plate-like in thickness as illustrated in FIG. 8. The coupling bracket 62 may comprise mounting points 72 disposed in any suitable orientation. For example, in the exemplary embodiment illustrated in FIG. 8, the mounting points 72 are holes within flanges 74 extending outwardly and radially positioned about the circular disc 70. In another example, the mounting points 72 are holes disposed within the circular disc 70 itself. The mounting points 72 are configured to receive the fasteners 66 to rigidly couple the coupling bracket 62 to the housing 40.

The circular disc 70 may be coupled to the distal face 48 of the housing 40. Coupling the coupling bracket 62 to distal face 48 of the housing 40 limits the space required by the EPS assembly 38, which is particularly advantageous during retrofitting existing vehicles without ample clearance for structures in addition to the housing 40. FIG. 6 shows that an entirety of the coupling bracket 62 is disposed within the profile of the housing 40 when viewed in plan. In other words, no portion of the coupling bracket 62 extends beyond the housing 40. Further, the circular disc 70 may encircle the steering shaft 26 with the steering shaft 26 extending through the circular disc 70. For example, FIG. 6 shows the aperture 73 of the circular disc 70 concentric with the steering shaft 26. In addition to maximizing the available space of the distal face 48 of the housing 40 to receive the coupling bracket 62, providing the aperture 73 with the circular disc 70 encircling the steering shaft 26 improves the prevention of rotation of the housing 40 about the steering shaft 26 relative to the chassis 32. The forces on the coupling bracket 62 from the link 64 are evenly distributed radially about the steering shaft 26, thereby minimizing any eccentric forces on the housing 40 relative to the steering shaft 26. Further, the link 64 may be coupled to the coupling bracket 62 at any radial position about the steering shaft 26. FIG. 6 shows the link 64 coupled to the coupling bracket 62 at the 8 o'clock position, but any suitable radial position is contemplated. Among other advantages, the modularity provides further ease with which the coupler 60 may be tailored to the chassis 32 of any vehicle 14 and retrofit to the same. Likewise, the circular disc 70 may be of any suitable outer diameter with the link 64 coupled to the circular disc 70 at any radial distance from the steering shaft 26. For example, larger housings may require the link 64 to be coupled to the coupling bracket 62 at a greater distance from the steering shaft 26 to tolerate larger inertial forces from the housing 40 during operation of the vehicle 14 (e.g., mitigate forces and/or moments of the housing 40). Additional related modifications of the coupling bracket 62 and the link 64 are contemplated and within the scope of the present disclosure.

The link 64 may comprise a rod 76 having opposing ends 78. The rod 76 is elongate and rigid. The rod 76 may comprise an internal or external thread (not shown) at one or both of the opposing ends 78 with the thread(s) adapted to receive a bearing socket 82 of a spherical joint 80 to be described. In other exemplary embodiments, the link 64 may be arcuate or of any suitable shape, cross section, and dimensions based on the space constraints of the application.

The link 64 comprises the spherical joint 80 adapted for coupling the coupling bracket 62 to the chassis 32. Preferably, each of the opposing ends 78 of the rod 76 include the spherical joint 80 with one of the spherical joints 80 coupling the rod 76 with the coupling bracket 62, and the other one of the spherical joints 80 adapted for coupling the rod 76 to the chassis 32. In the exemplary embodiment illustrated in FIGS. 5-8, each of the opposing ends 78 of the rod 76 comprises the bearing socket 82, and a bearing stud 84 of the spherical joint 80 is rigidly coupled to the chassis 32. The reverse configuration is contemplated wherein the bearing studs 84 are associated with the rod 76 and the bearing sockets 82 associated with the chassis 32 and/or the coupling bracket 62.

In certain embodiments, any suitable kinematic joint may be provided in addition to or as an alternative to spherical joints, including those with higher kinematic constrains (i.e., less degrees of freedom). For example, suitable kinematic joints may include lower pair joints such as revolute or hinge joints, prismatic joints, screw or helical joints, cylindrical joints, and planar joints; higher pair joints such as cylindrical rollers and cam pairs; and/or compound joints such as ball bearings, roller bearings, and universal joints. The coupler 60 is rigidly connected to the housing 40 and adapted for coupling the housing 40 to the mounting bracket 56 with a first kinematic joint. The link 64 is coupled to the coupling bracket 62 of the coupler 60 with a second kinematic joint. The first and second kinematic joints are adapted for permitting relative movement between the housing 40 and the mounting bracket 56 in five degrees of freedom. In one example, the first kinematic joint is a first spherical joint 80 and the second kinematic joint is a second spherical joint 80.

Those having skill in the art readily appreciate that spherical joints generally provide for relative motion between the socket and the stud in two planes, including rotation in those planes. A freely movable structure grounded with a single spherical joint provides for movement with three degrees of freedom; e.g., pitch, yaw, and roll. Providing a second structure coupled to the free end of the movable structure with a second spherical joint provides for movement with five degrees of freedom; e.g., y-axis, z-axis, pitch, yaw, and roll. The second structure relative to the ground is constrained only along the x-axis defined between the two spherical joints. As applied to the present disclosure, the rod 76 coupled to the chassis 32 (e.g., the mounting bracket 56 to be described) with the spherical joint 80 at one of the opposing ends 78 permits the rod 76 to rotate in any direction within the limits of the socket and the stud. Providing the second spherical joint 80 at the opposing end 78 of the rod 76, with the coupling bracket 62 coupled to the spherical joint 80 permits the coupling bracket 76 to rotate in any direction within the limits of the socket as well as move translationally about two axes. The kinematic constraint provided by the rod 76 with two spherical joints 80 is prevents translation about a singular axis defined by the rod 76 itself. Since the housing 40, and thus the coupling bracket 42, are constrained by the steering shaft 26 as previously described, the singular constraint provided by the coupler 60 is rotation of the housing 40 about the steering shaft 26 relative to the chassis 32. The steering shaft 26 and the coupler 60 collectively locate or constrain the housing 40 in five degrees of freedom relative to the chassis 32.

The electric powered steering system 20 may further comprise the mounting bracket 56. The mounting bracket 56 is adapted to be rigidly connected to the chassis 32 of the vehicle 14 with the coupler 60 coupling the housing 40 to the mounting bracket 56. The mounting bracket 56 may be rigidly connected to the chassis 32 distal the housing 40 of the EPS assembly 38, as illustrated in FIG. 5, with the steering shaft 26 extending through the mounting bracket 56. The steering shaft 26 rotates within to the mounting bracket 56, and may be axially movable (along z-axis) relative to the same. In certain embodiments, the coupler 60 may be considered a component of the EPS assembly 38 and provided as part of a retrofitting kit to be described.

Referring to FIGS. 5 and 7, the mounting bracket 56 comprises a mounting member 86. The mounting member 86 of FIGS. 5 and 7 is a planar, plate-like structure. The plate is pentagonal in shape when viewed in plan, but may alternatively be circular, triangular, square, rectangular, or any other suitable shape so as to rigidly connect the mounting bracket 56 to the chassis 32 of the vehicle 14. The mounting member 86 may comprise a plurality of holes 88 configured to receive fasteners such as bolts, pins, rivets, and the like. Additionally or alternatively, the mounting member 86 may be joined with the chassis 32 through welding, brazing, soldering, bonding, or any other suitable means. The mounting member 86 may be fabricated from a suitable metal such as steel.

The mounting bracket 86 may comprise a collar 90 extending upwardly or proximal to the mounting member 88 as shown in FIGS. 5 and 7. The collar 90 may be rigidly connected to the mounting member 88 through joining means such as adhesion or bonding, or the collar 90 may be a boss unitary or integral with the mounting member 88. The collar 90 may be substantially cylindrical and comprising an aperture (not shown). The steering shaft 26 extends through the aperture and rotates relative to the collar 90. The collar 90 may be fabricated from a polymer such as plastic. As previously described, the steering shaft 26 and the coupler 60 collectively locate or constrain the housing 40 in five degrees of freedom relative to the chassis 32. The remaining degree of freedom in which movement of the housing 40 is permitted relative to the chassis 32 is axial movement along the z-axis. The collar 90 is adapted for positioning the housing 40 relative to the chassis 32. The housing 40 is adapted to directly abut or rest atop the collar 90 of the mounting bracket 56, as best illustrated in FIG. 7, to maintain the coupler 60 in a generally neutral state to be described. Otherwise, the performance of the coupler 60 may be compromised by being subjected to constant force(s) due to misalignment of the steering shaft 26 and/or the housing 40, weight of the EPS assembly 38, or the like. For example, the steering shaft 26 may not be precisely concentric with the aperture of the collar 90 (e.g., tilted slightly), either following installation or operation of the vehicle 14. Relative movement between the housing 40 and the collar 90 is permitted, with the exception of rotation about the z-axis based on the constraints provided by the coupler 60 as described.

In another exemplary embodiment, the mounting bracket 56 does not include the collar 90. In such an embodiment, the steering shaft 26 locates or constrains the housing 40 of the EPS assembly 38 in five degrees of freedom, thusly permitting only relative rotation between the steering shaft 26 and the housing 40 as previously described. The embodiment requires one or more of the bearings to further prevent relative axial movement between the steering shaft 26 and the housing 40 (along the z-axis). In still other embodiments, a second collar 91 (see FIG. 3) may be provided and positioned proximal the housing 40 of the EPS assembly 38. The second collar 91 may be coupled to or unitary with the column bracket 34 positioned at a base of the steering column 22 and rigidly mounted to the chassis 32. The second collar 91 may be substantially cylindrical and comprising an aperture (not shown). The input shaft 24 or the steering shaft 26 extends through the aperture and rotates relative to the second collar 91. The second collar 91 may be fabricated from a polymer such as plastic. The second collar 91 is positioned adjacent the housing 40 opposite the collar 90. The combination of the collar 90 and the second collar 91 "sandwich" the housing 40 to locate or constrain movement along the z-axis.

The mounting bracket 86 comprises a riser 92 coupled to the mounting member 88. The riser 92 may be connected to the mounting member 88 though joining means such as welding or brazing, or fabricated integral with the mounting member 88 through milling or the like. With continued reference to FIGS. 5 and 7, the riser 92 is a rectangular prism, block-like structure disposed on the mounting member 88 extending proximally towards the housing 40. Other suitable shapes are contemplated, such as a cylinder or triangular prism. The riser 92 comprises an upper face 94 for function to be described.

The housing 40 rests atop the collar 90 as illustrated in FIG. 7 with the housing 40 spaced apart from mounting member 88 of the mounting bracket 56 by a thickness of the collar 90. The coupling bracket 62 of the coupler 60 is rigidly coupled to the housing 40, and thus the coupler 60 is spaced apart from mounting member 88 of the mounting bracket 56 by at least the thickness of the collar 90. In the exemplary embodiment of FIG. 7, the coupler 60 is spaced apart from mounting member 88 of the mounting bracket 56 by a distance greater than the thickness of the collar 90. The elevational view of FIG. 7 shows the link 64 of the coupler 60 coupled to the coupling bracket 62 opposite a main portion of the housing 40. In other words, the link 64 is coupled to a distal side of the coupling bracket 62. The arrangement results in the link 64 of the coupler being spaced apart from mounting member 88 at a distance. In order for the coupler 60 to couple the housing 40 to the mounting bracket 56, the riser 92 is provided with a predetermined height to orient the link 56 in the neutral state. As used herein, the neutral state refers to the coupler 60, and more particularly the spherical joints 80, being in a natural or unstressed position such that, for example, the link 56 may articulate to a maximum in all directions relative to the coupling bracket 62. Should the mounting bracket 56 be coupled to the housing 40 is in a horizontal orientation, the link 56 also is oriented horizontally in the neutral state, as shown in FIG. 7.

The coupler 60 couples the housing 40 and the mounting bracket 56. The coupler 60 prevents relative rotation between the housing 40 and the mounting bracket 56 while permitting relative movement between the housing 40 and the mounting bracket 56 in five degrees of freedom. In other words, absent the additional constraints on the housing 40 from the steering shaft 26, the housing 40 is adapted to translate in the y- and z-axes and pitch, yaw, and roll. Of course, the kinematic constraints from the steering shaft 26 further limit the movement of the housing 40 relative to the mounting bracket 56. In certain embodiments, the housing 40 is adapted to be free from connection to the chassis 32 except for a connection between the coupler 60 and the mounting bracket 56.

In the exemplary embodiment of FIGS. 5 and 7, the coupler 60 couples the mounting bracket 56 to the distal side 48 of the housing 40. The coupler 60 comprises the coupling bracket 62 with the link 64 coupled to the coupling bracket 62 and the mounting bracket 56. One of the spherical joints 80 connects the coupling bracket 62 of coupler 60 with the housing 40. Another one of the spherical joints 80 connects the coupling bracket 62 of the coupler 60 with the mounting bracket 56. The bearing stud 84 may be connected to the upper face 94 of riser 92. The bearing socket 82 connected to the link 56 receives the bearing stud 84. The reverse configuration is contemplated wherein the bearing stud 84 is associated with the rod 76 and the bearing sockets 82 is coupled to the upper face 94 of the riser 92. In embodiments where the link 56 comprises the rod 76 with opposing ends 78, one of the spherical joints 80 couples the rod 76 with the coupling bracket 62, and another one of the spherical joints 80 couples the rod 76 with the mounting bracket 56.

Among other advantages, providing the mounting bracket 56 distal the housing 40 limits the space required by the EPS assembly 38. The mounting bracket 56 has a profile (when viewed in plan) less than that of the housing 40. Larger or smaller mounting brackets may be selectively incorporated based on the chassis 32 of the vehicle 14, particularly in the context of retrofitting a chassis without electric powered steering. Furthermore, as best illustrated in the bottom plan view of FIG. 6, the link 64 of the coupler 60 may not extend beyond the profile of the housing 40 in order to be coupled to the chassis 32 of the vehicle 14. The relatively shorter link 64 prevents the rotation of the housing 40 relative to the chassis 32 while permitting the optimal amount of other relative movement as described.

Referring to FIG. 9, the coupler 60 in accordance with another exemplary embodiment is shown. The coupler 60 of FIG. 9 is coupled to the housing 40 in the same manner or method as the previously described embodiment. The coupler 60 comprises the coupling bracket 62 rigidly coupled to the housing 40, such as the substantially circular disc 70 defining the aperture 73. The coupling bracket 62 comprises the mounting points 72 as holes within the flanges 74 extending outwardly and radially positioned about the circular disc 70.

The coupler 60 further comprises a coupling flange 96 extending radially outward from the circular disc 70. FIG. 9 shows the coupling flange 96 extending radially outward from the circular disc 70 to a distance greater than the flanges 74. The present disclosure contemplates that the coupling flange 96 may be of any suitable length in order to be coupled to the chassis 32 (e.g., via the mounting bracket 56) in a manner to be described.

A slot 98 is disposed within the coupling flange 96. The slot 98 as illustrated in FIG. 9 is elongate and oriented longitudinally along the coupling flange 96. In certain embodiments, the slot 98 may be transverse to the coupling flange 96 or oriented at any predetermined angle. The orientation of the slot 98 may be influenced on the orientation of the housing 40 of the EPS assembly 38 relative to the mounting bracket 56 or the chassis 32.

The coupler 60 comprises a post 100 adapted to be rigidly coupled to the chassis 32. In one exemplary embodiment, the post 100 is rigidly connected to the upper face 94 of the riser 92 of the mounting bracket 56 as previously described. The slot 98 is configured to receive the post 100 to prevent rotational movement of the coupling bracket 62 of the coupler 60 about the steering shaft 26 while permitting axial movement of the coupling bracket 62 along with the steering shaft 26. In certain embodiments with the mounting bracket 56, the slot 98 is configured to receive the post 100 to prevent rotational movement of the coupling bracket 62 relative to the mounting bracket 56.

To provide the desired constraints of relative motion, the post 100 is slidably disposed within the slot 98. With continued reference to FIG. 9, the post 100 is suitably sized to the slot 98. More specifically, a width of the post 100 is approximate a width of the slot 98; however, a thickness of the post 100 is sufficiently smaller than a length of the slot 98 such that the post 100 is capable of translating within the slot 98 along one axis (e.g., the y-axis). In other words, the coupling bracket 62 can move along the y-axis relative to the mounting bracket 56 and/or the chassis 32. In one example, the post 100 is a cylinder, and the slot is substantially rectangular. Other cross-sectional shape of the post 100 are contemplated. Further, a length of the post 100 is sufficiently larger than a thickness of the coupling flange 96, and thus the slot 98, such that the post 100 is capable of translating within the slot 98 along one axis (e.g., the z-axis). In other words, the coupling bracket 62 can move along the z-axis relative to the mounting bracket 56 and/or the chassis 32. Since the width of the post 100 is approximate the width of the slot 98, the coupling bracket 56 is prevented from moving along the x-axis relative to the mounting bracket 56 and/or the chassis 32.

The post 100 within the slot 98 also provides for roll about the x-axis, as the coupling bracket 56 is permitted to articulate relative to the mounting bracket 56 and/or the chassis 32. It is also to be understood that given the approximate dimensions and relative tolerances between the post 100 and the slot 98, pitch and yaw may also be permitted. With the additional kinematic constraints provided by the steering shaft 26 to the housing 40 as previously described, the net result is essentially the same as the previous embodiment of the coupler 60. The housing 40 is adapted to be located or constrained relative to the chassis 32 in five degrees of freedom such that movement is permitted between the housing 40 and the chassis 32 in one degree of freedom; i.e., the housing 40 is axially movable relative to the chassis 32 (along the z-axis). The housing 40 also is adapted to be located or constrained relative to the steering shaft 26 in five degrees of freedom such that movement is permitted between the housing 40 and steering shaft 26 in one degree of freedom; i.e., the steering shaft 26 is rotatable relative to the housing 40, as described (yawing about the z-axis). The coupler 60 prevents a hyperstatic system in which the EPS assembly 38, and more particularly the sensor 42, are subjected to external loads from the steering shaft 26 during operation.

Referring now to FIG. 10, the coupler 60 in accordance with another exemplary embodiment is shown. In many respects the coupler 60 of FIG. 10 is the same as the coupler 60 of FIGS. 5-7 with only the differences to be described. The coupling bracket 62 is a generally triangular plate defining the aperture 73 generally triangular in shape. Bosses 104 extend outwardly from the coupling bracket 62 and define the mounting points 72 extending there through. The coupler 60 comprises the link 64, such as the rod 76 with opposing ends 78. The spherical joint 80 is disposed on one of the opposing ends 78 with the spherical joint 80 coupling the link 64 to the mounting bracket 56 and/or the chassis 32 of the vehicle 14. At another one of the opposing ends 78 a hinge joint 106 is provided. A bolt stud 108 comprising a shaft 110 and a head 112 is rigidly connected to the coupling bracket 62. The rod 76 defines an aperture 114 through which the shaft 110 of the bolt stud 108 is received. The hinge joint 106 provides for rotation of the rod 76 relative to the bolt stud 108. In certain embodiments, including the embodiment illustrated in FIG. 10, the shaft 110 of the bolt stud 108 has sufficiently length to provide for translational movement of the rod 76 relative to the bolt stud 108 along the shaft 110. In some embodiments, an outer diameter of the shaft 110 of the bolt stud 108 is sufficiently less than an inner diameter of the aperture 114 of the rod 76 such that "play" or jostle is provided between the rod 76 and the bolt stud 108 to effectively provide for pitching and yawing.

Still another advantage of the EPS assembly 38 of the present disclosure includes retrofitting existing vehicles previously not equipped with an electric powered steering system. The housing 40, the sensor 42, the computer module 44, the electric motor 46, the mounting bracket 56, and the coupler 60 may comprise a kit of the EPS assembly 38. In other embodiments, the steering column 22, the housing 40, the sensor 42, the computer module 44, the electric motor 46, the mounting bracket 56, and the coupler 60 may comprise the kit of the electric powered steering system 20. The kits are adapted to be installed on the chassis 32 of a variety of vehicles 14 without undue difficulty.

Vehicles not previously equipped with an electric powered steering system often lack the space for cumbersome mounting interfaces known in the art. In the electric powered steering system 20 of the present disclosure, the coupler 60 and the mounting bracket 56 may be entirely situated within the profile of the housing 40 (when viewed in plan) such that no spatial constraints prevent retrofitting the vehicle 14 other than the housing 40 itself. The components of the EPS assembly 38, including the mounting bracket 56 with the collar 90, the coupling bracket 62, and the link 64 may be catalogued to a variety of vehicles without undue burden or expense. Further, the coupler 60 and the mounting bracket 56 may be fabricated relatively inexpensively with readily accessible and cost-effective materials and manufacturing methods. The installation method of the electric powered steering system 20 to be described provides for ease with installation, maintenance, troubleshooting, and replacement.

Exemplary methods of installing and operating electric powered steering system 20 are also contemplated. The steering column 22 is mounted to the chassis 32 with the column bracket 34. The mounting bracket 56 is mounted to the chassis 32. The EPS assembly 38 is operatively coupled to the steering shaft 26 and positioned intermediate the column bracket 34 and the mounting bracket 56. The housing 40 of the EPS assembly 38 may rest atop the collar 90 of the mounting bracket 56. The coupler 60 is coupled to the housing 40. More specifically, the coupling bracket 62 is rigidly connected to the housing 40 such as the distal face 48 of the housing 40. The link 64 is coupled to the coupling bracket 62 with a kinematic joint such as the spherical joint 80. The link 64 is coupled to the chassis 32. The link 64 may be coupled to the mounting bracket 56 such as to the riser 92 of the mounting bracket 56 with the spherical joint 80.

The steering member 32 receives the input of the user. The sensor 42 detects the input from the user such as the change in torque and/or position of the input shaft 24 or the steering shaft 26. The computer module 44 receives signals from the sensor 42. The electric motor 46 supplies an assistive torque to the steering shaft 26 based on the signals with the assistive torque directed to moving the wheels 16 of the vehicle 14. The coupler 60 prevents rotational movement of the housing 40 about the steering shaft 26, and permits axial movement of the housing 40 along with the steering shaft 26. The coupler 60 permits relative movement between the housing 40 and the chassis 32 in five degrees of freedom including the axial movement of the housing 40 along with the steering shaft 26. The steering shaft 26 locates or constrains relative movement between the housing 40 and the chassis 32 in at least four of the five degrees of freedom. In certain embodiments, the electric powered steering system 20 comprises the mounting bracket 56 coupling the coupler 60 to the chassis 32 of the vehicle 14. The coupler 60 prevents rotational movement of the housing 40 about the steering shaft 26 relative to the mounting bracket 56, and permits axial movement of the housing 40 along with the steering shaft 26 relative to the mounting bracket 56. The coupler 60 permits relative movement between the housing 40 and the mounting bracket 56 in five degrees of freedom. The steering shaft locates or constrains relative movement between the housing 40 and the mounting bracket 56 in at least four of the five degrees of freedom.

It will be further appreciated that the terms "include," "includes," and "including" have the same meaning as the terms "comprise," "comprises," and "comprising."

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

Various additional alterations and changes beyond those already mentioned herein can be made to the above-described embodiments. This disclosure is presented for illustrative purposes and should not be interpreted as an exhaustive description of all embodiments or to limit the scope of the claims to the specific elements illustrated or described in connection with these embodiments. For example, and without limitation, any individual element(s) of the described embodiments may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Any reference to claim elements in the singular, for example, using the articles "a," "an," "the" or "said," is not to be construed as limiting the element to the singular.

What is claimed is:

1. An electric powered steering system for a vehicle comprising a chassis and wheels, said steering system comprising:
   a steering member for receiving an input from a user;
   a steering shaft coupled to said steering member for providing an output to move the wheels of the vehicle;
   a housing with said steering shaft at least partially extending through said housing;
   a sensor coupled to said housing for detecting said input from the user;
   a computer module in electric communication with said sensor for receiving signals from said sensor based on said input;
   an electric motor coupled to said housing and controllable by said computer module to supply an assistive torque to said steering shaft based on said signals with said assistive torque comprising said output; and
   a coupler adapted for coupling said housing to the chassis of the vehicle, said coupler preventing rotational movement of said housing about said steering shaft while permitting axial movement of said housing along with said steering shaft,
   wherein said coupler further comprises a coupling bracket rigidly coupled to said housing, and a link adapted for coupling said coupling bracket to the chassis with said link preventing rotational movement of said coupling bracket about said steering shaft while permitting axial movement of said coupling bracket along said steering shaft, and wherein said link further comprises a spherical joint adapted for coupling said coupling bracket to the chassis.

2. The electric powered steering system of claim 1, wherein said housing further comprises a distal side opposite a proximal side and separated by opposing lateral sides with said coupling bracket rigidly coupled to said distal side of said housing.

3. The electric power steering assembly of claim 1, wherein said link comprises a rod having opposing ends and a spherical joint at each of said opposing ends with one of said spherical joints coupling said rod with said coupling bracket, and another one of said spherical joints adapted for coupling said rod to the chassis.

4. The electric powered steering system of claim 1, wherein said coupler further comprises a coupling bracket rigidly coupled to said housing and comprising a slot, and a post adapted to be rigidly coupled to the chassis, wherein said slot of said coupling bracket is configured to receive said post to prevent rotational movement of said coupling bracket about said steering shaft while permitting axial movement of said coupling bracket along with said steering shaft.

5. The electric powered steering system of claim 4, wherein said housing further comprises a distal side opposite a proximal side and separated by opposing lateral sides with said coupling bracket rigidly coupled to said distal side of said housing.

6. The electric powered steering system of claim 1, wherein said housing is adapted to be free from connection to the chassis except for a connection from said coupler.

7. The electric powered steering system of claim 1, wherein said coupling bracket further comprises a substantially circular disc and mounting points disposed radially about said circular disc.

8. The electric powered steering system of claim 7, wherein said circular disc encircles said steering shaft.

9. The electric powered steering system of claim 1, further comprising a mounting bracket adapted to be rigidly coupled to the chassis with said coupler coupling said housing to said mounting bracket.

10. The electric powered steering system of claim 9, wherein said mounting bracket further comprises a collar having an aperture with said steering shaft extending through said aperture, wherein said housing abutting said collar such that said collar axially supports said housing relative to the chassis.

11. An electric powered steering assembly mountable on a chassis of a vehicle, said steering system comprising:
a housing;
a sensor coupled to said housing for detecting input from a user;
a computer module in electric communication with said sensor to receive signals from said sensor based on said input;
an electric motor coupled to said housing and controllable by said computer module;
a mounting bracket adapted to be rigidly connected to the chassis; and
a coupler coupling said housing and said mounting bracket with said coupler preventing relative rotation between said housing and said mounting bracket while permitting relative movement between said housing and said mounting bracket in five degrees of freedom, wherein said coupler further comprises a spherical joint connecting at least one of (a) said coupler with said housing, and (b) said coupler with said mounting bracket.

12. The electric powered steering assembly of claim 11, wherein said housing is adapted to be free from connection to the chassis except for a connection between said coupler and said mounting bracket.

13. The electric power steering assembly of claim 12, wherein said housing further comprises a distal side opposite a proximal side and separated by opposing lateral sides with said coupler coupling said mounting bracket and said distal side of said housing.

14. The electric power steering assembly of claim 11, wherein said coupler further comprises a coupling bracket rigidly attached to said housing, and a link coupled to said coupling bracket and said mounting bracket.

15. The electric power steering assembly of claim 11, wherein said housing further comprises a distal side opposite a proximal side and separated by opposing lateral sides with said coupler rigidly attached to said distal side of said housing.

16. The electric power steering assembly of claim 14, wherein said link comprises a rod having opposing ends and a spherical joint at each of said opposing ends with one of said spherical joints coupling said rod with said coupling bracket, and another one of said spherical joints coupling said rod with said mounting bracket.

17. The electric power steering assembly of claim 11, wherein said coupler further comprises a coupling bracket rigidly attached to said housing and comprising a slot, and a post rigidly coupled to said mounting bracket, wherein said slot of said coupling bracket is configured to receive said post to prevent rotational movement of said coupling bracket relative to said mounting bracket.

18. The electric power steering assembly of claim 17, wherein said post is slidably disposed within said slot so as to permit axial movement of said coupling bracket relative to said mounting bracket.

19. The electric power steering assembly of claim 11, wherein said mounting bracket further comprises a collar with said housing abutting said collar such that said collar is adapted for positioning said housing relative to the chassis.

20. An electric powered steering assembly mountable to a mounting bracket rigidly connected to a chassis of a vehicle comprising a steering shaft, said steering assembly comprising:
a housing adapted for receiving the steering shaft;
a sensor coupled to said housing for detecting input from a user;
a computer module in electric communication with said sensor to receive signals from said sensor based on said input;
an electric motor coupled to said housing and controllable by said computer module; and
a coupler rigidly connected to said housing and adapted for coupling said housing to the mounting bracket with a first kinematic joint, said coupler comprising a coupling bracket and a link coupled to said coupling bracket with a second kinematic joint with said first and second kinematic joints adapted for permitting relative movement between said housing and the mounting bracket in five degrees of freedom,
wherein said first kinematic joint is a first spherical joint and said second kinematic joint is a second spherical joint.

21. The electric powered steering assembly of claim 20, wherein said coupler is adapted for preventing rotation of said housing about the steering shaft relative to the chassis.

22. The electric powered steering assembly of claim 20, wherein said link is an elongate rod with opposing ends with said first spherical joint at one of the opposing ends of said elongate rod and said second spherical joint at another one of said opposing ends.

23. A method of operating electric powered steering system for a vehicle comprising a chassis and wheels with the electric powered steering system comprising a steering member for receiving an input from a user, a steering shaft coupled to the steering member, a housing with the steering shaft at least partially extending through the housing, a sensor coupled to the housing for detecting the input from the user, a computer module in electric communication with the sensor, an electric motor coupled to the housing and controllable by the computer module, and a coupler coupling the housing to the chassis of the vehicle, wherein the coupler further comprises a coupling bracket rigidly coupled to the housing and a link adapted for coupling the coupling bracket to the chassis, and wherein the link further comprises a spherical joint adapted for coupling the coupling bracket to the chassis, said method comprising the steps of:
  receiving with the steering member the input of the user;
  detecting with the sensor the input from the user;
  receiving with the computer module signals from the sensor;
  supplying an assistive torque with the electric motor to the steering shaft based on the signals with the assistive torque directed to moving the wheels of the vehicle;
  preventing with the coupler rotational movement of the housing about the steering shaft; and
  permitting with the coupler axial movement of the housing along with the steering shaft.

24. The method of claim 23, further comprising the step of permitting with the coupler relative movement between the housing and the chassis in five degrees of freedom including the axial movement of the housing along with the steering shaft.

25. The method of claim 24, further comprising the step of locating or constraining with the steering shaft relative movement between the housing and the chassis in at least four of the five degrees of freedom.

26. The method of claim 23, wherein the electric powered steering system comprises a mounting bracket coupling the coupler to the chassis of the vehicle, said method further comprising the steps of:

preventing with the coupler rotational movement of the housing about the steering shaft relative to the mounting bracket; and
  permitting with the coupler axial movement of the housing along with the steering shaft relative to the mounting bracket.

27. The method of claim 26, further comprising the step of permitting with the coupler relative movement between the housing and the mounting bracket in five degrees of freedom.

28. The method of claim 27, further comprising the step of locating or constraining with the steering shaft relative movement between the housing and the mounting bracket in at least four of the five degrees of freedom.

29. An electric powered steering system for a vehicle comprising a chassis and wheels, said steering system comprising:
  a steering member for receiving an input from a user;
  a steering shaft coupled to said steering member for providing an output to move the wheels of the vehicle;
  a housing with said steering shaft at least partially extending through said housing;
  a sensor coupled to said housing for detecting said input from the user;
  a computer module in electric communication with said sensor for receiving signals from said sensor based on said input;
  an electric motor coupled to said housing and controllable by said computer module to supply an assistive torque to said steering shaft based on said signals with said assistive torque comprising said output; and
  a coupler adapted for coupling said housing to the chassis of the vehicle, said coupler preventing rotational movement of said housing about said steering shaft while permitting axial movement of said housing along with said steering shaft, wherein said coupler comprises:
    a coupling bracket rigidly coupled to said housing, and
    a link adapted for coupling said coupling bracket to the chassis with said link preventing rotational movement of said coupling bracket about said steering shaft while permitting axial movement of said coupling bracket along said steering shaft,
    wherein said coupling bracket further comprises a substantially circular disc and mounting points disposed radially about said circular disc.

30. The electric powered steering system of claim 29, wherein said circular disc encircles said steering shaft.

* * * * *